(12) United States Patent
Hoshii et al.

(10) Patent No.: US 7,551,315 B2
(45) Date of Patent: Jun. 23, 2009

(54) COLOR MATCHING ACCURACY UNDER MULTIPLE PRINTING CONDITIONS

(75) Inventors: Jun Hoshii, Nagano-ken (JP); Keiichi Noto, Nagano-ken (JP)

(73) Assignee: Seiko Epson Corportion, Tokyo (JP)

( * ) Notice: Subject to any disclaimer, the term of this patent is extended or adjusted under 35 U.S.C. 154(b) by 756 days.

(21) Appl. No.: 11/067,413

(22) Filed: Feb. 24, 2005

(65) Prior Publication Data
US 2005/0200866 A1    Sep. 15, 2005

(30) Foreign Application Priority Data
Feb. 25, 2004    (JP) .............. 2004-049341
Apr. 22, 2004    (JP) .............. 2004-126816

(51) Int. Cl.
*G06F 15/00* (2006.01)
(52) U.S. Cl. .............. 358/1.2; 358/1.9; 358/1.13
(58) Field of Classification Search .............. 358/1.9, 358/523, 524, 501, 502, 504, 534, 1.1, 1.13, 358/1.18, 1.2, 1.7, 3.27, 3.31, 3.12
See application file for complete search history.

(56) References Cited

U.S. PATENT DOCUMENTS

| | | | | |
|---|---|---|---|---|
| 6,128,090 | A * | 10/2000 | hunsel et al. | 356/402 |
| 6,341,833 | B1 * | 1/2002 | Liu et al. | 347/15 |
| 2002/0080394 | A1 * | 6/2002 | Ogasahara et al. | 358/1.15 |
| 2002/0113985 | A1 * | 8/2002 | Tayuki | 358/1.9 |
| 2002/0135627 | A1 * | 9/2002 | Takahashi et al. | 347/19 |
| 2003/0016263 | A1 * | 1/2003 | Takahashi et al. | 347/19 |
| 2004/0207674 | A1 * | 10/2004 | Otsuki | 347/19 |
| 2004/0239726 | A1 * | 12/2004 | Hoshii | 347/43 |

(Continued)

FOREIGN PATENT DOCUMENTS

JP    09-186898    7/1997

(Continued)

OTHER PUBLICATIONS

Abstract of Japanese Patent Publication No. 09-186898, Pub. Date: Jul. 15, 1997, Patent Abstracts of Japan.

(Continued)

*Primary Examiner*—Madeleine A Nguyen
(74) *Attorney, Agent, or Firm*—Martine Penilla & Gencarella, LLP

(57) ABSTRACT

When creating recording level specifying data referred to during recording of ink drops of N types (N is an integer of 2 or greater) of different ink levels onto a printing medium by a printing device, standard color value data indicating an association relationship between ink tone values and color values under a standard printing condition is acquired; under a predetermined printing condition, and using at least one type of the aforementioned N types of ink drops for each ink color, patches are printed at a plurality of recording levels, and the color values of the printed patches are acquired; the aforementioned plurality of recording levels are associated with color values; and on the basis of association of the aforementioned plurality of recording levels and color values and of the aforementioned standard color value data, there is created recording level specifying data that specifies, for each ink color, an association relationship recording levels of the aforementioned N types of ink drops and tone values under the aforementioned predetermined printing condition.

3 Claims, 26 Drawing Sheets

U.S. PATENT DOCUMENTS

| | | | |
|---|---|---|---|
| 2005/0006486 A1* | 1/2005 | Koifman et al. | 235/494 |
| 2005/0094169 A1* | 5/2005 | Berns et al. | 358/1.9 |
| 2005/0094871 A1* | 5/2005 | Berns et al. | 382/162 |
| 2005/0105110 A1* | 5/2005 | Katsuyama | 358/1.9 |
| 2005/0248615 A1* | 11/2005 | Ono | 347/43 |
| 2006/0087529 A1* | 4/2006 | Tayuki | 347/19 |

FOREIGN PATENT DOCUMENTS

JP     2001-158085     6/2001

OTHER PUBLICATIONS

Abstract of Japanese Patent Publication No. 2001-158085, Pub. Date: Jun. 12, 2001, Patent Abstracts of Japan.

* cited by examiner

|  | LUT | large/medium/small allocation table | |
|---|---|---|---|
| Resolution 1 | 40KB | 4KB | ⎫ |
| Resolution 2 | 40KB | 4KB | ⎬ conventional |
| Resolution 3 | 40KB | 4KB | ⎭ |
| Resolution 1 | 40KB | 4KB | ⎫ |
| Resolution 2 | — | 22KB | ⎬ present invention |
| Resolution 3 | — | 22KB | ⎭ |

FIG.2

Cace of C standard large/medium/small allocation table TA1

| tone values for each ink color | ink drop recording level | | |
|---|---|---|---|
| | small dot | medium dot | large dot |
| 0 | D1s(0) | D1m(0) | D1l(0) |
| ⋮ | ⋮ | ⋮ | ⋮ |
| g1 | D1s(g1) | D1m(g1) | D1l(g1) |
| ⋮ | ⋮ | ⋮ | ⋮ |
| 255 | D1s(255) | D1m(255) | D1l(255) |

D1      D4 derived large/medium/small allocation table TA2

| tone values for each ink color | ink drop recording level | | |
|---|---|---|---|
| | small dot | medium dot | large dot |
| 0 | D2s(0) | D2m(0) | D2l(0) |
| ⋮ | ⋮ | ⋮ | ⋮ |
| g1 | D2s(g1) | D2m(g1) | D2l(g1) |
| ⋮ | ⋮ | ⋮ | ⋮ |
| 255 | D2s(255) | D2m(255) | D2l(255) |

D2      D5 derived large/medium/small allocation table TA3

| tone values for each ink color | ink drop recording level | | |
|---|---|---|---|
| | small dot | medium dot | large dot |
| 0 | D3s(0) | D3m(0) | D3l(0) |
| ⋮ | ⋮ | ⋮ | ⋮ |
| g1 | D3s(g1) | D3m(g1) | D3l(g1) |
| ⋮ | ⋮ | ⋮ | ⋮ |
| 255 | D3s(255) | D3m(255) | D3l(255) |

Conventional

|  | color conversion LUT | large/medium/small allocation table |
|---|---|---|
| standard ink use | 29KB | 5KB |
| target ink 1 use | 29KB | 5KB |
| target ink 2 use | 29KB | 5KB | total 102KB

Present invention

|  | color conversion LUT | large/medium/small allocation table |
|---|---|---|
| standard ink use | 29KB | 5KB |
| target ink 1 use | — | 5KB |
| target ink 2 use | — | 5KB | total 44KB

COLOR MATCHING ACCURACY UNDER MULTIPLE PRINTING CONDITIONS

BACKGROUND OF THE INVENTION

1. Field of the Invention

The present invention relates to improving color matching accuracy when recording N types of ink drops containing different amounts of ink onto a printing medium, under to a plurality of printing conditions.

2. Description of the Related Art

In printing devices, even where images are printed on the basis of a given set of image data, printing can typically be executed under different multiple printing conditions by means of selecting the resolution and so on. Where printing conditions differ, various conditions besides the resolution mentioned above, such as the amount of ink per single ink drop, will vary as well; this makes it necessary to perform color matching, so that images printed on the basis of given image data in a printing device will always have the same color. In the past, color matching has been performed by creating a color conversion table for each resolution, and selecting a color conversion table to match the resolution at the time of printing (see, for example, Unexamined Patent Application 9-186898).

In printing control devices of this type, making reference to a color conversion LUT (color conversion table), image data consisting of RGB (red, green blue) tone values is color-converted to image data consisting of CMYK (cyan, magenta, yellow, black) one values for example; dot recording rates for dots of each size producible by the printer are determined; dot on-off state for each dot size is decided on the basis of the determined dot recording rates; and dots are formed by the printer on the basis of the decision results. In the printer, dots corresponding to given decision results are formed on a printing medium, to print a multi-tone image (see Unexamined Patent Application 2001-158085). With this same technology, for each dot size, selection patterns that combine CMY dots are printed onto a printing medium, the selection pattern visually determined to have the best CMY balance due to variability in ink ejection quantity is selected, and on the basis of the result, the recording level specifying data is corrected in such a way as to compensate for shift in CMY balance. Then, referring to the corrected recording level specifying data, dot on-off state for each dot size is decided, and dots are formed on the basis of the decision results.

SUMMARY OF THE INVENTION

With the prior art technology described hereinabove, considerable resources are required, and the task of creating a color conversion table for each resolution required much labor. More specifically, in a color conversion table it is typically necessary to associate with three-dimensional input tone values output tone values of dimensions equal to the number of ink colors (6-dimensional etc.), and to specify association relationships for large number of reference points, e.g. $17^3$. Thus, where data prepared according to a number of printing conditions and specifying association relationships for such a large number of reference points is recorded onto a recording medium, an extremely large amount of memory capacity is required.

When specifying association relationships for reference points of a color conversion table, it is necessary to perform the task of printing a patch with actual tone values, and carrying out color measurement on the printed patch. While this color measurement task need not always be carried out on all of the $17^3$ reference points mentioned above, color measurement of at least about $10^3$ patches is necessary in order to ensure adequate accuracy in color conversion. Accordingly, considerable labor is required in carrying out color measurement of large numbers of patches, according to a number of printing conditions.

Further, after a color conversion table has been created, in the event that it is desired to readjust a color having low color matching accuracy, or where color matching accuracy of a printing device has declined over time, to perform calibration to readjust the color, the process of doing so was difficult. That is, since a color conversion table specifies color association relationships through representation of color by means of combinations of color components of each color, it becomes necessary to simultaneously adjust all of the color components of each color, making it exceedingly difficult to simultaneously adjust all of the color components of each color in order to match a color, without causing a drop in color matching accuracy of other colors not targeted for adjustment.

With the foregoing in view, it is an object of the present invention to carry out highly accurate color matching for each printing condition, while holding at a minimum the resources required, the task of preparing data needed for correction, and the calibration task.

To achieve the stated object at least in part, recording level specifying data for each printing condition is created in such a way that, for a given tone value, the color value is the same even if printing conditions differ. In the present invention, in order to create recording level specifying data for each printing condition, association relationships between ink color tone values and color values in a standard printing condition is specified in advance in standard color value data. By printing patches at a plurality of recording levels and acquiring their color values, output color at each recording level is ascertained. Once an association relationship between recording level and color values, and an association relationship between tone values and color values have been identified, recording level and tone values can be associated with one another to create recording level specifying data.

In the present invention, the former association relationship is derived by means of actual printing of patches under intended printing conditions at a plurality of recording levels; the latter association relationship is derived on the basis of standard color value data prepared in advance. As a result, ink drop recording level for carrying out output at intended saturation can be identified on the basis of any tone value in an intended printing condition. That is, recording level specifying data for carrying out color matching under any intended printing condition can be created.

In the present invention, since recording level specifying data is created on the basis of a patch printed under a predetermined printing condition, color matching can be performed on a per-printing condition basis by means of carrying out the recording level specifying data created process on a per-printing condition basis. It is also possible to carry out color matching on a per-printing condition basis while attenuating various differences arising due to printing conditions by means of the color conversion table etc., as in the prior art described previously.

However, the recording level specifying data in the present invention typically has a far smaller volume of data as compared to a color conversion table. Specifically, in recording level specifying data according to the invention, there are specified tone values and recording levels of N types of ink drops, with N recording levels being associated with one-dimensional tone values. In a color conversion table, on the other hand, it is typical for three-dimensional tone value combinations to be associated with six-dimensional or above tone value combinations. More specifically, in a color conversion table, it is necessary to specify association relationships for a large number of reference points, e.g. $17^3$.

In recording level specifying data that associates tone values and recording levels of N types of ink drops, on the other hand, it is sufficient to specify approximately 33 reference points for the tone values, and to define recording levels of N types of ink drops for the reference points. Accordingly, the volume of recording level specifying data is overwhelmingly less in comparison to a color conversion table. Thus, it becomes possible to carry out highly accurate color matching while holding down the resources required to a very low level. Also, in an arrangement wherein color matching is carried out under each of a plurality of printing conditions as in the present invention, since it is necessary to prepare recording level specifying data capacity equivalent to the number of printing conditions, the advantage of smaller volume, as compared to preparing color conversion tables in numbers equivalent to the number of printing conditions, becomes markedly apparent.

The invention affords excellent task efficiency in the data creation task as well. That is, in patches printed during creation of the recording level specifying data, it suffices simply to associate one-dimensional tone values with color values, whereas in patches printed during creation of a color conversion table, it is necessary to associate output values produced by combinations of multi-dimensional tone values, with color values. Accordingly, for a given tone value area, the former requires a much smaller number of patches than the latter, and the load represented by the data creation task is markedly lower. Additionally, since the volume of information of recording level specifying data is much smaller, if it is desired to verify accuracy of color conversion in recording level specifying data that has already been created, or to perform calibration in order to adjust content of recording level specifying data after a change over time has occurred in a printing device, it is possible for calibration to be carried out with less work.

Herein, it is sufficient for the plurality of printing conditions to consist of printing conditions such that different printing conditions produce variations in recording levels of N types of ink drops, in ink level per unit ink drop, and so on. Any condition whereby output color differs where printing is executed at a given recording level under different conditions may be designated as a printing condition for the purposes of the invention. As a printing condition there could be employed, for example, the resolution of the printing device. That is, since the definition required in an image differs with different resolution, ink level per unit ink drop is modified on a per-resolution basis.

Thus, unless association relationships between per-ink color basis tone values and recording levels of N types of ink drops are modified on a per-resolution basis, color matching on a per-resolution basis cannot be carried out. By creating recording level specifying data on per-printing condition basis in accordance with the present invention, it becomes possible to carry out color matching on a per-printing condition basis. Of course, the printing condition is not limited to resolution, it being possible instead to employ any of various other conditions such as type of ink supported by the printer (e.g. dye based, pigment based etc.), type of media (e.g. paper type, ability to print CD labels, etc.), and so on.

Various arrangements may be employed as arrangements for recording N types of ink drops onto printing media. Specifically, herein it is sufficient for ink drop size (ink drop level) to be variable, so that pixels of different sizes can be formed on a printing medium. Thus, while it is acceptable for N to be 2 or greater, there is frequently employed an arrangement in which three types of ink drops are used, in order to be able to represent tone of a pixel by 2 bits.

In the standard color value data, it is sufficient to associate per-ink color tone values and color values with one another. Here, per-ink color tone values are values that indicate in stepwise fashion changes in density, brightness etc. for each ink color used in the printing device. Color values may simply be values indicating output color in each tone value, and can be represented using coordinate values in a device-independent color space such as the L*a*b* color space. When representing color values, while best accuracy is afforded by the use of all color components that make up the color space, it would also be acceptable for simplification purposes to indicate output color in tone values using only some of the color components. Of course, in such instances output color may be represented using different color components of a per-ink color basis.

For the patch printing process, it will suffice to be able to print a patch under predetermined printing conditions so as to record ink drops at a plurality of target recording levels. That is, it will suffice to be able to print patches for measuring color recorded at each recording level. Thus, in preferred practice, there will be selected a plurality of target recording levels encompassing colors corresponding to an entire value range of tone values of a per-ink color basis. Of course, since any of the of N types of ink drops or some combination thereof is recorded for a single tone value, in a single target recording level, recording levels are specified for all of the N types of ink drops.

In the color value data acquisition process, it will suffice to be able to acquire color value data indicating color values for the patch. Accordingly, it is possible to employ an arrangement such as subjecting the printed patch to color measurement with a predetermined colorimeter, and acquiring the color measurement results by means of a predetermined interface, or acquiring them via a predetermined recording medium.

In the recording level specifying data creation process, it will suffice to be able to refer to color value data and standard color value data to create recording level specifying data that associates recording levels of N types of ink drops with target tone values. That is, by means of the aforementioned color value data, there is identified an association relationship between recording levels of the N types of ink drops, and color values derived by printing at these recording levels, under predetermined printing conditions. Color values to be associated with tone values are also identified by means of the standard color value data. The recording level specifying data is created from the two association relationships.

In the standard color value data acquisition process, it will suffice for, at a minimum, per-ink color tone values to be associated with color values, and to be able to construct standard color value data even where data does not directly specify an association relationship between tone values and color values. For example, [standard color value data] could be composed of data including standard color conversion table data and standard recording level specifying data. That is, in a printing device capable of recording N types of ink drops, there is frequently employed an arrangement whereby input tone values are subjected to color conversion with reference to the color conversion table, the color-converted tone values are converted to recording levels on a per-ink drop basis with reference to the recording level specifying data, and printing is executed.

At this time, the aforementioned input tone values are converted by means of standard color conversion table data and standard recording level specifying data; the patch produced with the recording levels derived by the conversion is printed under a standard printing condition, and color values of the printout are adjusted in advance so as to match color values that correspond to the aforementioned input tone values. Accordingly, by making reference to the standard color conversion table data and the standard recording level specifying data, it is possible to readily ascertain the association relationship between per-ink color tone values and color values. Creation of sets of standard color conversion table data and standard recording level specifying data in color matching in a printing device is known art.

In the present invention, however, it suffices to create a single set of this standard data under a predetermined printing condition, with color matching being carried out by creating recording level specifying data on a per-printing condition basis, for other printing conditions. Accordingly, while it is necessary to create a single set of standard color conversion table data and standard recording level specifying data for the purpose of performing color matching, it is not the case that color conversion tables are created on a per-printing condition basis, whereby highly accurate color matching can be carried out on a per-printing condition basis, while holding at a minimum the resources required, the task of preparing data needed for correction, and the calibration task. Additionally, as the aforementioned input tone values, it suffices to identify colors uniquely by means of their tone values, it being possible to employ color systems of various kinds, such as coordinates in a device-independent color space or color component values of the RGB standard.

Here, by way of specific example of standard recording level specifying data, there could be employed an arrangement specifying an association relationship between per-ink color tone values and ink drop recording levels, common to all of the ink colors. That is, when referring to standard color conversion table data and standard recording level specifying data to convert input tone values into ink recording levels, and performing printing, color matching by means of adjustment using standard color conversion table data can be carried out even where the standard recording level specifying data is common to all colors.

Specifically, standard recording level specifying data common to all ink colors is created, and color values of output colors derived by converting per-ink color tone values with this data are subjected to color measurement. Since the color values that should correspond with input tone values have been identified in advance, if these analyzed color values are used, the input tone values and per-ink color tone values can be associated with one another to create standard color conversion table data. That is, by carrying out a color measurement procedure and associating input tone values with per-ink color tone values, color matching can be carried out even where using recording level specifying data that is common to all ink colors. Where recording level specifying data is common to all ink colors, there is no need to create recording level specifying data on a per-ink color basis, so the resources required and the manpower entailed in the creation process thereof can be kept to a minimum.

Also, by way of specific example of the recording level specifying data creation process, there could be employed an arrangement whereby recording level specifying data is created individual for each ink color. That is, ink drop recording levels for per-ink color tone values may differ by color. By creating recording level specifying data for each color, it becomes possible to carry out color matching with high accuracy. In the present invention, color matching on a per-printing condition basis is carried out by means of creating recording level specifying data on a per-printing condition basis. Accordingly, there could be employed an arrangement whereby, in instances where varying at least the recording level specifying data on a per-printing condition basis enables color matching to be carried out with higher accuracy than with printing at recording levels common to each printing condition, recording level specifying data common to each ink color can be created.

As a preferred arrangement for the patch printing process, there could be employed an arrangement whereby tentative recording level specifying data that specifies a tentative association relationship for the aforementioned tone values and recording levels of N types of ink drops is prepared. That is, where a plurality of target tone values are identified by tentative recording level specifying data that specifies a tentative association relationship, the recording level specifying data taught in the invention can be created simply by performing adjustment based on the tentative recording level specifying data in the recording level specifying data creation process.

As a preferred arrangement for tentative recording level specifying data, there could be employed an arrangement whereby ink level per unit ink drop on a per-condition basis for a plurality of printing conditions is taken into consideration to create in advance on a per-condition basis for the plurality of printing conditions. That is, while a color value corresponding to a recording level cannot be known unless printing is carried out under each printing condition and subjected to color measurement, ink level per unit ink drop can be determined in advance on a per-printing condition basis. Accordingly, tentative recording level specifying data is created on a per-printing condition basis, and at this time the ink level per unit ink drop is made to differ on a per-printing condition basis.

For example, when creating tentative recording level specifying data in a printing apparatus able to record three types of ink drops, i.e. small, medium, and large, for example, only the large ink drop recording level is associated with per-ink color tone values, and subsequently some or all of the large ink drops are allocated to small and medium dots in such a way that the overall recording level of ink drops is unchanged. Even where tentative recording level specifying data is created according to such a rule, where ink level per unit ink drop differs due to differing print resolution by way of a printing condition, the tentative recording level specifying data will differ on a per-printing condition basis as well. Accordingly, by utilizing tentative recording level specifying data that takes into consideration ink level per unit ink drop, it is possible to create recording level specifying data to accurately reflect items that should be modified on a per-printing condition basis.

Further, in the recording level specifying data creation process, it is possible to readily create recording level specifying data on a per-printing condition basis by means of utilizing the tentative recording level specifying data mentioned above. That is, by making reference to tentative recording level specifying data and color values of the aforementioned patch it is possible to ascertain, from the association relationship between a tentative ink level and a tone value specified in the tentative recording level specifying data, the color value of a color printed at the tentative ink recording level in question. Also, by referring to the standard recording level specifying data, the color value of a color to be printed by a target tone value can be ascertained.

Accordingly, where tentative ink recording levels that output the color values of color to be printed by target tone values are calculated, and the tone values are associated with tentative ink recording levels, target tone values under each printing condition will become associated with ink recording levels for outputting color values to be printed by these tone values. By so doing, recording level specifying data can be created easily. Since this recording level specifying data is based on color values derived by printing patches according to actual printing conditions, color matching can be carried out accurately on a per-printing condition basis.

It suffices that recording level specifying data consist of data associating an ink drop recording level with a target tone value; it may be composed of data associating ink drop recording levels with a plurality of target tone values. Various techniques may be employed during selection of this target tone value. For example, in an arrangement utilizing the standard color conversion table data mentioned previously for example, there are instances in which a plurality of tone values are stored as per-ink color tone values by the standard color conversion table data, but the stored tone values are not spaced apart at uniform intervals. In such instances, a specific value range in which tone values stored in the standard color conversion table data are distributed more widely than in other value ranges is extracted, and tone values included in this value range are selected in greater numbers than from other value ranges, to be designated as target tone values.

That is, the fact that tone values stored in standard color conversion table data are not selected uniformly and are biased depending on the value range may have some advantages, such as that the presence of bias improves color conversion accuracy, or affords rich tone representation. Accordingly, by selecting as recording level specifying data as well target tone values imparting bias of similar pattern to the standard color conversion table data, it becomes possible to preserve advantages analogous to the advantages mentioned above.

The arrangements hereinabove take the form of a recording level specifying data creation device for carrying out color matching on a per-printing condition basis with a high degree of accuracy in a printing device capable of recording N types of ink drops; however, the invention could also be reduced to practice as a method based upon a similar technical idea. Reduction to practice as a program for carrying out the invention is also possible.

Any kind of recording medium could be used to provide the program. For example, a magnetic recording medium or magnetooptical recording medium would be acceptable, and any recording medium that may be developed in future may be though of in exactly the same manner. Whether realized in part by means of software and in part by means of hardware, the idea of the invention differs nowise, and includes arrangements wherein portions being recorded on a recording medium are read out appropriately as needed.

In the present invention, there is created recording level specifying data that enables color matching to b carried out with high accuracy on a per-printing condition basis, and thus the technical idea of the invention can be said to be utilized in a printing control device, method or program wherein reference is made to recording level specifying data after creation to determine recording levels for N types of ink drops.

On the other hand, where recording level specifying data is corrected depending on variability in ink ejection levels as taught in Unexamined Patent Application 2001-158085, in the event that the CMYK ink set used by the printer is modified, it was necessary in the past to recreate the color conversion LUT, and the printer calibration process was quite time-consuming. Also, when switching among multiple ink sets, it was necessary to store several color conversion LUTs in memory, making it necessary to ensure a memory area sufficient for the large amount of data.

With the foregoing in view, it is another object of the present invention to make it unnecessary to recreate a color conversion table such as a color conversion table, even in instances where the ink set used by a printing device is changed, speeding up the calibration procedure; and making it unnecessary to record a plurality of color conversion tables even in instances where a plurality of ink sets are exchanged, reducing the amount of data that must be recorded.

To achieve the aforementioned object, the invention, in an arrangement wherein during performance of print control of a printing device able to record on a printing medium two or more types of dots (same as ink drops) containing different ink levels, per-ink color tone values representing ink usage levels used by the printer at each pixel making up image data is converted to tone values representing recording levels of N types of ink drops on a per-type basis, and print control is carried out using the converted tone values; wherein recording level specifying data that compensates for deviation in output color between a standard ink serving as a standard and a target ink serving as a target.

This recording level specifying data is data that specifies association relationships between color tone values of each ink)color and ink drop recording levels of target ink; making reference to the recording level specifying data, tone values of each ink color are converted to recording levels for the N types of ink drops. Here, the recording level specifying data is specified so as to compensate, with respect each of the aforementioned N types of ink drops, for color deviation between a standard image printed onto a printing medium at standard ink drop recording levels using standard ink, and a standard image printed onto a printing medium at standard ink drop recording levels using the aforementioned target ink.

In print control as described above, control of the printing device is carried out such that N types of ink drops corresponding to the converted recording levels are formed on the printing medium to print the printed image. By so doing, in the printed image that is printed onto the printing medium when using the target ink in the printing device targeted for printing control, compensation of color deviation is made for each of the N types of ink drops.

By means of using recording level specifying data that associates tone values of each ink color and ink drop recording levels of N types of ink drops for a target ink to compensate for differences in color between a standard ink and the target ink, the need to recreate the color conversion table is obviated even where the ink set used by the printing device is changed, making it possible to speed up the calibration procedure of a printing device on which printing control will be exercised using the target ink (referred to herein also as a "target printing device"). Additionally, since it becomes unnecessary to record a plurality of color conversion tables even in instances where a plurality of ink sets are exchanged, it becomes possible to reduce the amount of data that must be recorded.

The aforementioned ink drop recording level may be a level represented in terms of the number of ink dots formed per unit of area on a printing medium, or a dot recording rate representing a ratio of the number of ink dots.

The standard image can be either an image formed with one type of ink, or an image formed with two or more types of ink. Here, where the image overall is a uniform solid color image, more accurate color value data can be derived so it will be possible to obtain good color reproduction with respect to standard color, for the target printing device.

Where a single type of standard recording level is employed, it is possible to carry out the calibration process faster.

The image data mentioned above may consist of data representing an image by tone value of each pixel for example. It suffices for pixels to be present in numbers that can represent the image, with multiple pixel arrangements being possible; for example, a small image could be represented by 4×4 pixels or 8×8 pixels.

The aforementioned recording level specifying data can take the form of a large/medium/small allocation table of information table form, of conversion equation parameter group, or the like. The recording level specifying data can be data specifying association relationships between tone values of each ink color and recording levels of N types of ink drops, with the data specifying ink drop recording levels in all tones of the tone values of each ink color, or specifying ink drop recording levels in a portion of the tones of the tone values of each ink color.

The recording level specifying data can be constituted as data stipulating association relationships between the aforementioned tone values of each ink color and the aforementioned recording levels, in such a way as to minimize differences between standard color value data derived by color measurement in a predetermined color space performed on a standard image printed onto a printing medium at standard ink drop recording levels using the aforementioned standard ink, and color value data derived by color measurement in the same predetermined color space performed on a standard image printed onto a printing medium at standard ink drop recording levels using the aforementioned target ink. Since association relationships of recording level specifying data are specified from color value data that can be evaluated more objectively, the recording level specifying data can minimize differences in color between the standard ink and the target ink with a greater degree of accuracy. Accordingly, it is possible with a greater degree of accuracy to derive a printed image with less color deviation due to differences in ink.

Color value data of the aforementioned standard image includes data representing difference in color between a standard image and the printing medium onto which the standard image has been printed. Differences in color value data can be represented as color difference in a predetermined color space, differences in brightness (e.g. lightness), or the like.

When carrying out color conversion of first image data representing an image on a per-pixel basis with tone values for each first elemental color, into tone values for each ink color represented by the aforementioned tone values for each ink color, the invention may be reduced to practice in an arrangement whereby reference is made to a color conversion table that specifies association relationships for each first elemental color to aforementioned tone values for each ink color, when carrying out the color conversion process to convert color. In the present invention, since reference can be made to the recording level specifying data when converting tone values for each ink color to recording levels for each ink color, it becomes possible to carry out color matching by modifying the recording level specifying data, even in instances where the ink set used by the printing device is changed. Accordingly, the need to recreate the color conversion table is obviated, making it possible to speed up the calibration procedure of the printing device. Additionally, since it becomes unnecessary to record a plurality of color conversion tables even in instances where a plurality of ink sets are exchanged, it is possible to reduce the amount of data that must be recorded.

The aforementioned color conversion table can take the form of a color conversion table of information table form, of conversion equation parameter group, or the like.

In the present invention, an arrangement wherein there is provided a data recording area having recorded therein recording level specifying data for each combination of ink used simultaneously by the aforementioned printing device, and the aforementioned color conversion table shared irrespective of the combination of inks used. In the color conversion process in this case, reference can be made to the shared color conversion table in the data recording area when converting first image data to tone values for each ink color. During conversion after color conversion, reference can be made to the recording level specifying data that, of the recording level specifying data for each ink combination, corresponds to the combination of inks used by the printing device, when converting tone values for each ink color into recording levels.

By means of the above, even in cases where a plurality of ink sets are exchanged for use, a shared color conversion table can be utilized simply by switching between to recording level specifying data for reference, so that it is possible to reduce the amount of data that must be recorded.

The aforementioned printing device may be a standard printing device serving as a standard. By so doing, it is possible to create recording level specifying data for the standard printing device for use as a target printing device, so that the labor entailed in creating the recording level specifying data can be minimized.

Also, where an index quantity that increases monotonically or decreases monotonically with respect to change in recording level of ink drops, which index quantity is selected from among a plurality of index quantities derived from color value data during color measurement, performed in a predetermined color space, of index value selection images printed on a printing medium while varying the recording level of ink drops of the aforementioned standard ink, is designated as a monotonic index quantity, an arrangement wherein the aforementioned recording level specifying data is data specifying association relationships between the aforementioned tone values of each ink color and the aforementioned recording levels in such a way as to minimize difference between a standard monotonic index quantity derived by color measurement, performed in the same predetermined color space, of a standard image that has been printed onto a printing medium at a standard ink drop recording level using the aforementioned standard ink, and a monotonic index quantity derived by color measurement, performed in the same predetermined color space, of a standard image that has been printed onto a printing medium at a standard ink drop recording level using the aforementioned target ink. That is, since association relationships of the recording level specifying data are specified in such a way as to minimize difference in monotonic index quantity of two standard images on the exclusive basis of a monotonic index quantity that, of a plurality of index quantities derived from color value data, exhibits monotonic increase or monotonic decrease (hereinafter referred to also as "monotonic change"), good color reproduction by the target printing device can be achieved.

The aforementioned plurality of index quantities may be composed of the respective color component levels of the predetermined color space, and the color difference between a standard image printed using standard ink or target ink in the color space, with respect to the printing medium onto which the standard image is printed. By limiting the index quantities to a selection range of monotonic index quantities used in recording level specifying data creation, it is possible to speed up the calibration procedure of the target printing device, while maintaining good color reproducibility of the printing device.

Herein, with regard to the aforementioned color space, color components, and color component levels, in the case of the CIE L*a*b* color space standard of the Commission Internationale de l'Eclairage (CIE), these would be the L*, a*, and b* color components and their values; in the case of the CIE L*u*v* color space, these would be the L*, u*, and v* color components and their values; in the case of the CIE XYZ color space, these would be the X, Y, and Z color components and their values; or in the case of the RGB color space, these would be the R, G, and B color components and their values; with various other combinations being possible as well. Here, L* is an element color representing Lightness (brightness); a*, b*, u* and v* are elemental colors representing hue and saturation. Hereinbelow, the "*" will be omitted for simplicity.

Where the plurality of color component levels are all tone values with the same tone number, this is useful in that it is possible to more accurately obtain color reproducibility with respect to standard color for a target printing device; whereas an arrangement wherein the plurality of color component levels are used as-is for the levels defining the color space has the advantage of simplicity.

Where the monotonic index quantity that, of the aforementioned monotonic index quantities, has the greatest difference with respect to change in recording level of ink drops of the aforementioned standard ink is designated as the selected index quantity, an arrangement wherein the aforementioned recording level specifying data is data specifying association relationships between the aforementioned tone values of each ink color and the aforementioned recording levels in such a way as to minimize difference between a standard selected index quantity derived by color measurement of a standard image that has been printed onto a printing medium at a standard ink drop recording level using the aforementioned standard ink, and a selected index quantity derived by color measurement of a standard image that has been printed onto a printing medium at a standard ink drop recording level using the aforementioned target ink. Since association relationships of the recording level specifying data are specified in such a way as to minimize difference exclusively for the monotonic index quantity that among the monotonic index quantities has the greatest difference with respect to change in recording level of ink drops, it is possible to speed up the calibration procedure of the target printing device.

Here, monotonic index quantity with the greatest difference with respect to change in recording level of ink drops includes the monotonic index quantity with the greatest change with respect to change in recording level of ink drops.

When performing print control of a printing device able to record onto a printing medium two or more types of dots with different ink levels for ink loaded at a predetermined loading location, there may be employed an arrangement whereby printing with standard ink and printing with target ink are carried out, recording level specifying data is created, and printing is executed while referring to this recording level specifying data.

With the above arrangement as well it becomes unnecessary to recreate the color conversion table in instances where the ink set used by the printing device is changed, making it possible to speed up the calibration procedure. Also, it becomes unnecessary to record a plurality of color conversion tables even in instances where a plurality of ink sets are exchanged, making it possible to reduce the amount of data that must be recorded.

Additionally, the invention may be reduced to practice as a method for creating recording level specifying data specifying association relationships between the aforementioned tone values of each ink color and ink drop recording levels of target ink in such a way as to compensate, for each of the aforementioned N types of ink drops, color deviation between a standard image printed onto a printing medium at a standard ink drop recording level when the aforementioned standard ink is used, and a standard image printed onto a printing medium at a standard ink drop recording level when the aforementioned target ink is used.

By referring to recording level specifying data created by the above method when converting tone values for each ink color into recording levels, and performing print control using the converted recording levels, it becomes unnecessary to recreate the color even in instances where the ink set used by the printing device is changed, making it possible to speed up the calibration procedure of the target printing device. Also, it becomes unnecessary to record a plurality of color conversion tables even in instances where a plurality of ink sets are exchanged, making it possible to reduce the amount of data that must be recorded.

The printing control method and recording level specifying data creation method described hereinabove may be implemented together with other methods, in a form incorporated into a particular device, or may include any of various other embodiments. For example, implementation in a printing system comprising a printing device is possible. The invention could also be reduced to practice as a device or program corresponding to the aforementioned printing control method and recording level specifying data creation method.

BRIEF DESCRIPTION OF THE DRAWINGS

FIG. 2 is an illustration showing differences in resources.

FIG. 13 a model depiction of the structure of a large/medium/small allocation table.

DETAILED DESCRIPTION

Figure 1:
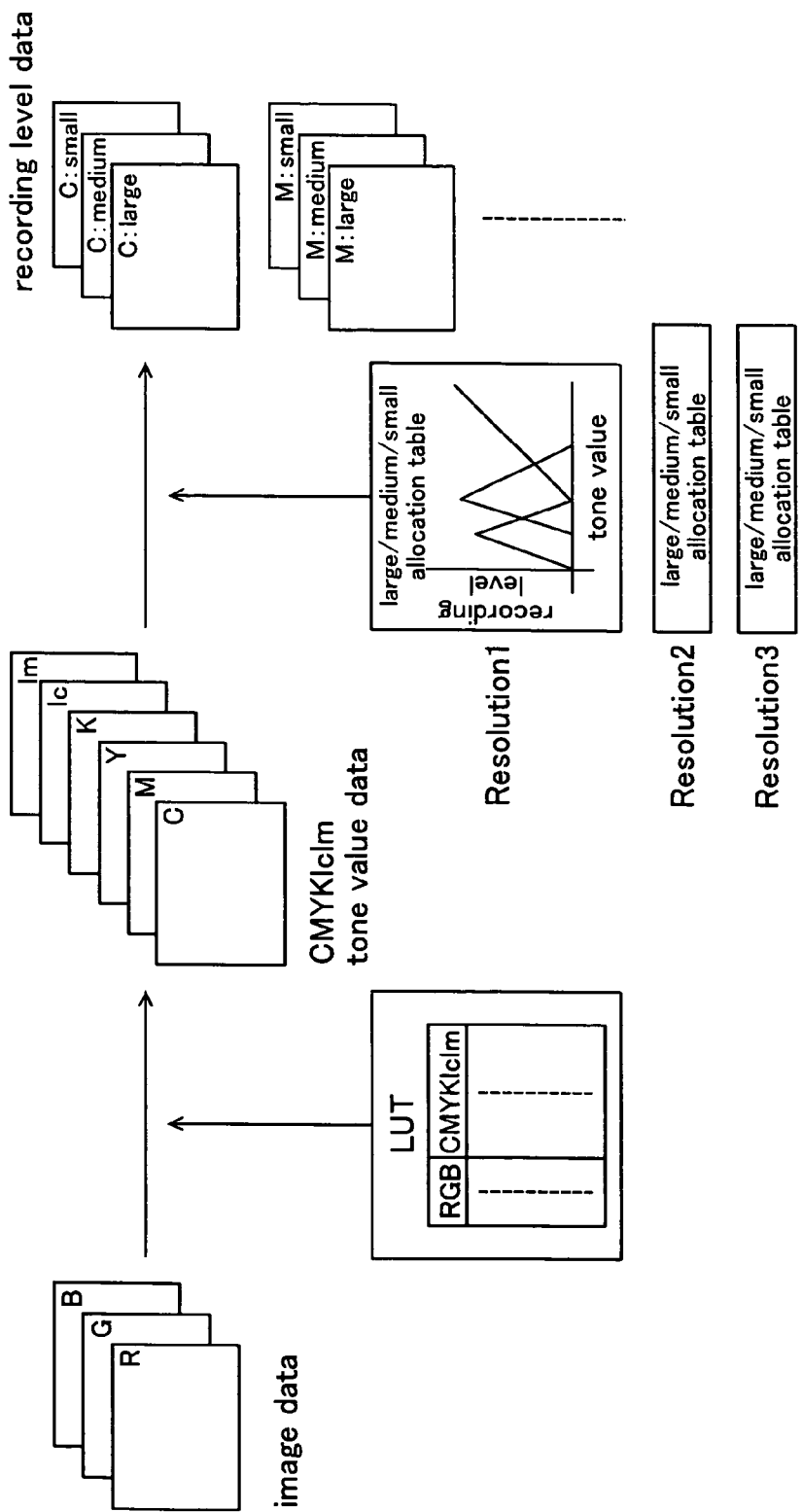
FIG. 1 is a simplified illustration of the invention.

The embodiments of the invention shall be described herein in the order indicated hereinbelow.
(1) Overview of the Invention:
(2) Arrangement of Large/medium/small Allocation Table Creation Device:
(3) Other Working Examples:
(4) Arrangement of Printing System and Recording Level Specifying Data Creation Device in Embodiment 2:
(5) Recording Level Specifying Data Creation Method and Creation Process:
(6) Printing Control Process Using Recording Level Specifying Data:
(7) Variation Example of Embodiment 2
 (1) Overview of the Invention:

FIG. 1 is a simplified illustration showing a setup for performing color matching with high accuracy with large/medium/small allocation tables. In the drawing, there is shown in model form conversion of color system and data format during the printing process. Rectangles with letters indicated at upper right indicate image data composed of pixels in dot matrix arrangement; RGB denote red, green, and blue respectively; and CMYKlclm represent cyan, magenta, yellow, black, light cyan and light magenta respectively. Large, medium and small appearing in the rectangles at right in the drawing indicate ink drop size. That is, the printer in the present invention is capable of ejecting ink drops containing three different levels of ink, making it possible to represent any of four tones for a single pixel. Herein, focusing upon the size of ink drops, ink drops are classified as large, medium, and small.

The drawing depicts, in the printing process, conversion of RGB image to CMYKlclm tone value data, followed by conversion to recording level data indicating recording levels of large, medium, and small dots for each of the colors CMYKlclm. Here, RGB image data is image data representing an image targeted for printing, composed for example of tone data of 256 tones for each of the colors RGB. CMYKlclm tone value data is tone data for each ink color used by the printer, composed for example of tone data of 256 tones for each color.

Of course, the color components that make up the image data and tone value data are not limited to RGB and CMYKlclm in FIG. 1. CMYKlclm recording level data is data specifying recording level on a large/medium/small dot basis for each of the colors CMYKlclm, composed for example of tone data of 256 tones for each dot. While both CMYKlclm tone value data and CMYKlclm recording level data can be represented by tone data, herein the latter is classified as representing recording level.

Conversion from RGB image data to CMYKlclm tone value data is carried out by means of a color conversion table (LUT). The LUT consists of data that associates combinations of RGB tone values with combinations of CMYKlclm tone values for a plurality of reference points (e.g. $17^3$ points). By means of this, an association relationship for any tone value combination in the two color systems can be specified, and any RGB image data can be converted to CMYKlclm tone value data by means of interpolation.

Conversion from CMYKlclm tone value data to CMYKlclm recording level data is carried out by means of large/medium/small allocation tables. The large/medium/small allocation tables contain data associating large/medium/small dot recording levels with a plurality of tone values (33, for example). By means of this, an association relationship for any tone value and large/medium/small dot recording level can be specified, and any CMYKlclm tone value can be converted to large/medium/small dot recording level by means of interpolation.

During printing by the printer, printing is carried out while specifying various printing conditions such as resolution at the time of printing; depending on printing conditions, a predetermined setting varies, e.g. the level per drop of large/medium/small dots varies. Accordingly, when printing is carried out using a shared LUT and large/medium/small allocation tables for each printing condition, it is not possible to perform color matching under all printing conditions. Accordingly, this is typically dealt with by creating data for each printing condition, for example.

That is, a LUT is typically used to convert data of the RGB color system to data of the CMYKlclm while performing color matching. Large/medium/small allocation tables are typically used simply to allocate CMYKlclm tone values to small/medium/large dots. Accordingly, in the past, a LUT was created such that color matching is performed when printing is carried out by large/medium/small allocation rules predetermined for each printing condition. In the present invention, however, matching is performed for each printing condition by using a shared LUT under a plurality of printing conditions, while creating different large/medium/small allocation tables for each printing condition.

More specifically, a LUT and large/medium/small allocation tables are created such that color matching is carried out under a standard printing condition (in FIG. 1, Resolution 1), the LUT being appropriate also for use under different printing conditions (in FIG. 1, Resolution 2 and Resolution 3), and adjusting the large/medium/small allocation tables so that color matching is carried out. When creating the LUT, definitions are made from an association relationship between colorimetric values of a patch printed by means of a combination of a plurality (e.g. on the order of $10^3$) of CMYKlclm tone values with color values corresponding to the RGB image data such that colors associated with the aforementioned reference points match one another.

In printing of this patch, making reference to large/medium/small allocation tables created according to a predetermined large/medium/small allocation rule for the standard printing condition, the CMYKlclm tone values are converted to large/medium/small dot recording levels. This rule is defined, for example, such that for large/medium/small dots respectively, an increase in tone value is accompanied by an increase in ink recording level according to a specific rule, defined such that an increase in tone value is accompanied by an increase in lightness of output color according to a specific rule, or the like, it being possible to employ various rules.

Regardless of the particular kind of rule, once large/medium/small allocation tables have been determined, since large/medium/small dot recording levels are specified for tone values under the standard printing condition, main force color [sic; output color?] printed by each tone value is determined uniquely. Accordingly, the LUT is created from the association relationship of colorimetric values of the patch with color values of the RGB image data. That is, under the standard printing condition, CMYKlclm tone values that output color equivalent to color signified by the RGB data in the LUT is extracted, and the two are associated with one another. Color matching is accomplished by means of this.

On the other hand, under printing conditions other than the standard printing condition, the large/medium/small allocation tables derived by following the large/medium/small allocation rule mentioned above will differ. For example, where a setting differs depending on printing condition (such as where ejection level per large/medium/small dot single drop varies), results obtained will differ even where the large/medium/small allocation rule is the same. However, as the large/medium/small allocation rule is not a rule for carrying out color matching, even if different large/medium/small allocation tables are created for each printing condition according to the large/medium/small allocation rule, color matching cannot be accomplished with these alone.

Accordingly, whereas in the past a LUT was created for each printing condition, in the present invention, large/medium/small allocation tables are adjusted for each printing condition in the manner described later in order to perform color matching. As a result, in the present invention, color matching with high accuracy can be realized with a minimum of resources. Also, the burden of the data creation tasks and correction tasks for color matching can be reduced.

FIG. 2 is an example diagram illustrating differences in resources for an arrangement creating an LUT for each printing condition, and an arrangement adjusting, large/medium/small allocation tables for each printing condition. In the example shown in the drawing, the LUT associates RGB image data with CMYKlclm tone values for $17^3$ reference points, and has a capacity of about 40 KB. In the large/medium/small allocation tables, they are associated with large/medium/small dot recording levels for 33 tone values.

In large/medium/small allocation tables, there are instances in which shared recording levels are acceptable for the colors CMYKlclm, and instances in which it is necessary for recording levels adjusted for each of the colors CMYKlclm. That is, where color matching is carried out by means of a LUT, shared large/medium/small allocation tables for the colors CMYKlclm are acceptable, whereas where color matching is carried out by means of large/medium/small allocation tables, it is necessary to make adjustments for each of the colors CMYKlclm. In the example in FIG. 2, the former requires about 4 KB and the latter requires about 22 KB.

In FIG. 2, conventional LUTs and large/medium/small allocation tables are shown at top, and the LUT and large/medium/small allocation tables pertaining to the invention are shown at bottom. Specifically, in conventional practice color matching is carried out by means of adjusting reference points which are stored in a LUT, so a separate LUT is needed for each printing condition. In this case, since color matching is carried out by means of LUTs, it is acceptable for large/medium/small allocation tables to be shared by each color. Accordingly, where printing conditions are Resolution 1-Resolution 3, three 40 KB LUTS and three 4 KB large/medium/small allocation tables, for a total of 132 KB of memory capacity, will be required.

In the present invention on the other hand, color matching utilizing a LUT is performed only at Resolution 1, with color matching at Resolutions 2, 3 being carried out with large/medium/small allocation tables, while appropriated the LUT used at Resolution 1. Accordingly, one 40 KB LUT, one 4 KB large/medium/small allocation table, and four 22 KB large/medium/small allocation tables, for a total of 88 KB of memory capacity, will suffice, so that the resources required can be reduced.

The work entailed in the creation process for this data is also less with the present invention, making it possible to readily prepare data. That is, when creating the LUT, while it is necessary to print the approximately $10^3$ patches mentioned earlier, since the tone values specified in the large/medium/small allocation tables number only about 33, the number of patches needing to be printed during adjustment is only about 33. Accordingly, while the work entailed in the creation process for Resolution 1 is the same for both the conventional art and the present invention, the work for Resolutions 2 and 3 is appreciably less with the present invention. Additionally, the present invention also affords appreciably less work during readjustment of the LUT and large/medium/small allocation tables. That is, even when reprinting patches during readjustment, the work entailed in the process is less, so that readjustment is possible readily.

Figure 3:
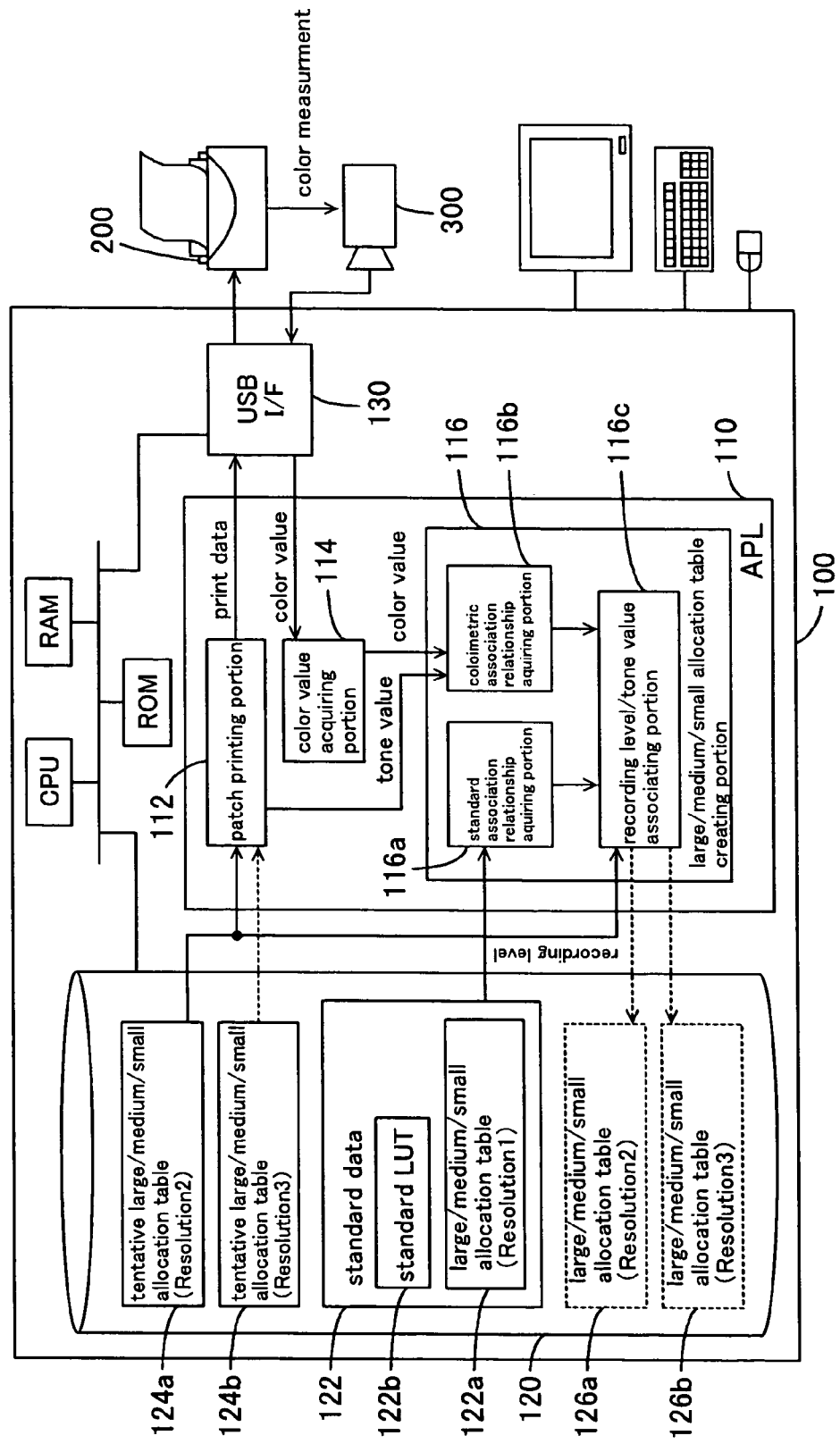
FIG. 3 is a block diagram showing a configuration example of a large/medium/small allocation table creating device.

(2) Arrangement of Large/Medium/Small Allocation Table Creation Device:

FIG. 3 is a block diagram showing a configuration example of a large/medium/small allocation table creating device. In the illustrated embodiment, an application software (APL) 110 for creating large/medium/small allocation tables is run on a computer 100, whereby the computer 100 functions as a large/medium/small allocation table creating device. In FIG. 3, the computer 100 is equipped with a display and a keyboard or other user interface, as well as being equipped with a hard disk drive (HDD) 120 or other storage device. Also provided are a CPU, RAM, ROM or other program execution environment, these devices executing the APL 110 under the control of an operating system, not shown.

A printer 200 is connected to the computer 100 via a USB I/F 130. The printer 200 is able to have installed thereon tanks filled with six colors of ink CMYKlclm, and is an ink-jet printing that records images by ejecting large/medium/small ink drops of each color. This printer 20o is able to execute printing at a plurality of default resolutions (Resolution 1-Resolution 3), and can execute printing while varying the level [of ink] per large/medium/small dot drop at each resolution.

It is additionally possible to connect a colorimeter 300 to the computer 100. The colorimeter 300 illuminates a printout with a known light source, detects the reflected light in order to detect the spectral reflectance of the printout, and is able to output color values thereof, e.g. L*a*b* values or XYZ values. Data indicating color values is transferred to the computer 100 via the USB I/F 130.

The APL 110 comprises a patch printing portion 112, a color value acquiring portion 114, and a large/medium/small allocation table creating portion 116, and refers to standard data 122 and tentative large/medium/small allocation tables 124a, 124b recorded on the HDD 120, to create large/medium/small allocation tables 126a, 126b. The standard data 122 includes a standard LUT 122b and a large/medium/small allocation table 122a enabling color matching to be performed at a standard resolution (Resolution 1).

Figure 4:
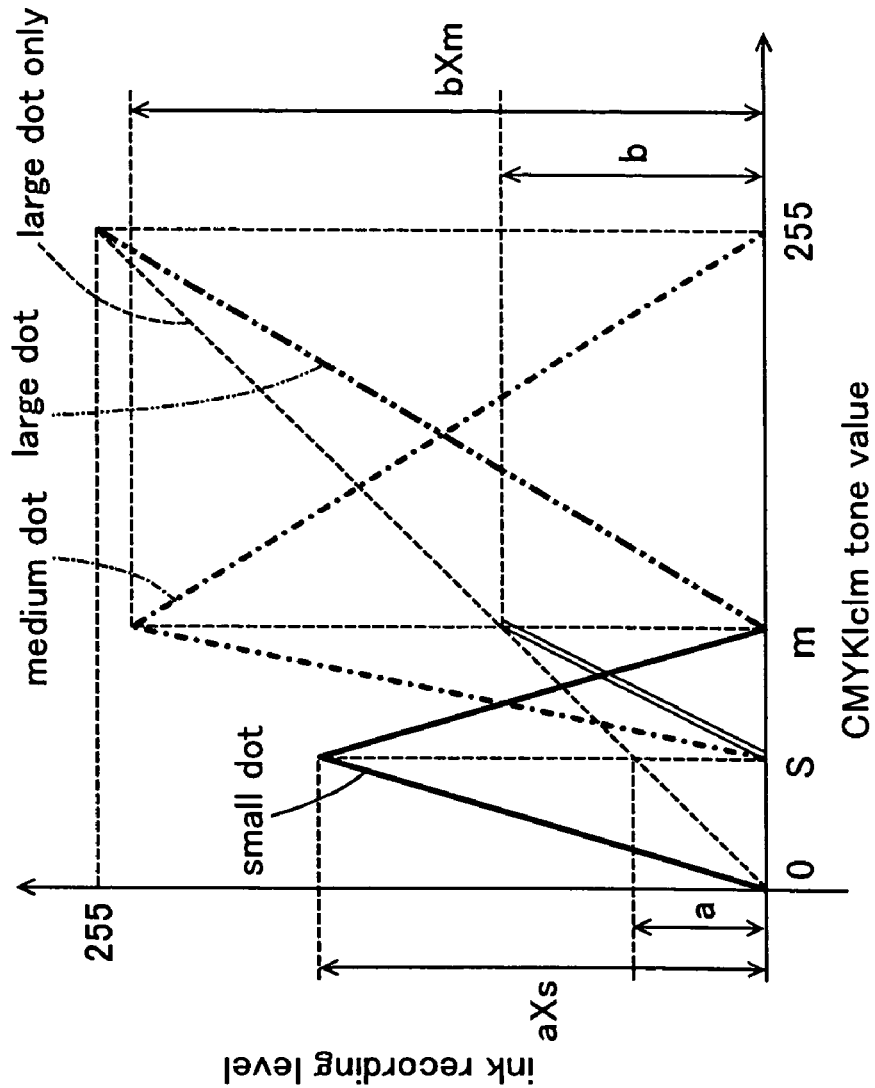
FIG. 4 is an illustration explaining a large/medium/small dot allocation rule.

(2-1) Tentative Large/Medium/Small Allocation Table Arrangement:

As noted, the large/medium/small allocation table 122a and the tentative large/medium/small allocation tables 124a, 124b contain table data created according to a large/medium/small allocation rule; in this embodiment, they are created by defining an allocation rule based on weight ratios of large/medium/small dots. FIG. 4 is an illustration explaining a large/medium/small dot allocation rule. In the drawing, CMYKlclm tone values are plotted on the horizontal axis, and ink recording levels are plotted on the vertical axis. Small dot ink recording level is represented by a solid line, medium dot ink recording level by a dot-dash line, and large dot ink recording level by a double-dot-dash line.

When performing large/medium/small allocation, first, correlation between tone value and ink recording level is determined for large dots only. In FIG. 4, as indicated by the broken line, as tone value increases in linear fashion from 0 to 255, tone value indicating ink recording level also increases in linear fashion from 0 to 255. In this embodiment, large dots are replaced with small dots and medium dots by means of equivalent-weight conversion based on this premise. That is, where the weight ratio of a large dot to a small dot is aXs:a, the large dot level a is substituted by the small dot level aXs. Where the weight ratio of a large dot to a medium dot is bXm:b, the large dot level b is substituted by the medium dot level bXm.

In the example of FIG. 4, the correlation of large dots only, indicated by the broken line, is a straight line having slope 1; from tone value 0 until tone value s at which the small dot ink recording level reaches maximum, all large dots are allocated to small dots. Accordingly, from tone value 0 to tone value s small dots are a straight line of slope Xs, as indicated by the solid line. From tone value s to tone value m at which the medium dot ink recording level reaches maximum, small dot slope is −Xs. Where substitution with small dots is carried out in this way, the large dot ink recording level from tone value 0 to tone value s is 0, and from tone values s-m the ink recording level is as shown by double lines.

In FIG. 4, ink recording level of large dots only, indicated by the double lines, is replaced with ink of medium dots. As a result, the medium dot recording level becomes a straight line as indicated by the dot-dash line having slope that is a multiple Xm of the slope of the aforementioned double lines. For tone values m–255, ink recording level is such that the medium dot ink recording level varies in linear fashion from maximum value to 0, with the remainder being the ink recording level for large dots as indicated by the double-dot-dash line. The above allocation rule is merely exemplary: of course, specific values of tone value s and tone value m are not limited, nor are variation patterns of large/medium/small dots limited, with arrangements such that recording level is unchanged in certain tone value ranges being acceptable as well. It would also be acceptable to establish a binding condition, such that ink recording levels not exceed a predetermined value.

In this embodiment, large/medium/small dot weight ratios differ by resolution. That is, since the definition required of an image varies with different resolutions, large/medium/small dot weights become lighter at higher definition. Accordingly, even where as tone value increases in linear fashion from 0 to 255, tone value indicating large dot recording level also increases in linear fashion from 0 to 255 as shown in FIG. 4, and where allocation to small/medium dots is carried out by the same rule, the large/medium/small allocation tables derived [at different resolutions] will differ.

Figure 5:
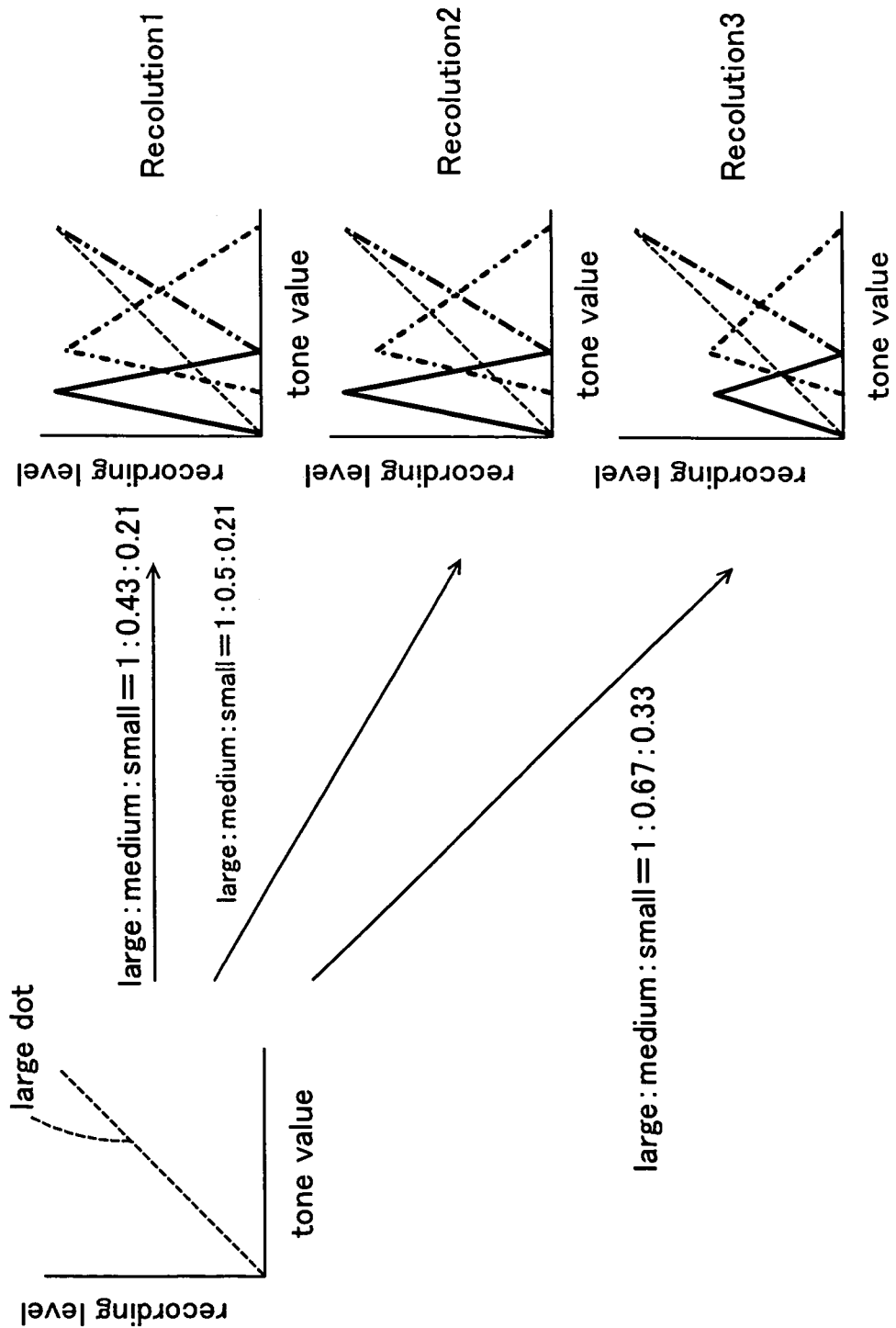
FIG. 5 is an illustration showing allocation tables differing by resolution.

FIG. 5 is an illustration showing allocation tables differing by resolution; in this embodiment, large dot recording level that varies in linear fashion for tone values of 0 to 255 are replaced by small dots and medium dots, using the same rule at each resolution. The allocation table shown at top right in the drawing is the table for Resolution 1; the large:medium:small dot weight ratio=1:0.43:0.21. The allocation table shown at middle right in the drawing is the table for Resolution 2; the large:medium:small dot weight ratio=1:0.5:0.21. The allocation table shown at bottom right in the drawing is the table for Resolution 3; the large medium:small dot weight ratio=1:0.67:0.33.

As a result, these differ in various ways, e.g., when compared for the maximum recording level for small dots, Resolution 1=Resolution 2>Resolution 3, whereas when compared for the maximum recording level for medium dots, Resolution 1>Resolution 2>Resolution 3. The aforementioned large/medium/small allocation table 122a is the table created for Resolution 1, and the tentative large/medium/small allocation tables 124a, 124b are the tables created for Resolution 2 and Resolution 3 respectively.

In this embodiment, none of the large/medium/small allocation table 122a and the tentative large/medium/small allocation tables 124a, 124b are differentiated by color for tone values of the colors CMYKlclm, and are simply data specifying an association relationship between tone value and large/medium/small dot recording level. However, in the large/medium/small allocation table 122a, color matching is performed by referring to the standard LUT 122b in a group. That is, patches printed at Resolution 1 are subjected to color measurement, and the standard LUT 122b is created by associating calorimetric values with color values indicated by RGB image data. Accordingly, color matching can be carried out even though the large/medium/small allocation table 122a is common to each color.

On the other hand, as regards the tentative large/medium/small allocation tables 124a, 124b, color matching is performed by making reference to these when creating large/medium/small allocation tables 126a, 126b by means of a process of the APL 110. It is in this sense that the tentative large/medium/small allocation tables 124a, 124b are designated as "tentative." Where reference is made to the aforementioned standard LUT 122b and large/medium/small allocation tables 122, RGB image data corresponding to any tone value can be calculated, so that the color value corresponding to any tone value can be calculated.

More specifically, where RGB data is data of the sRGB standard, color values can be calculated from RGB tone values. In the present invention, association relationships between tone values and color values are acquired by the large/medium/small allocation table creating portion 116 in the manner described later; however, the standard LUT 122b for acquiring association relationships between tone values and color values is not limited to the form described above, it being possible instead to employ a profile in which CMYKlclm tone values and color values (e.g. L*a*b*) are associated, such as an ICC profile.

Figure 6:
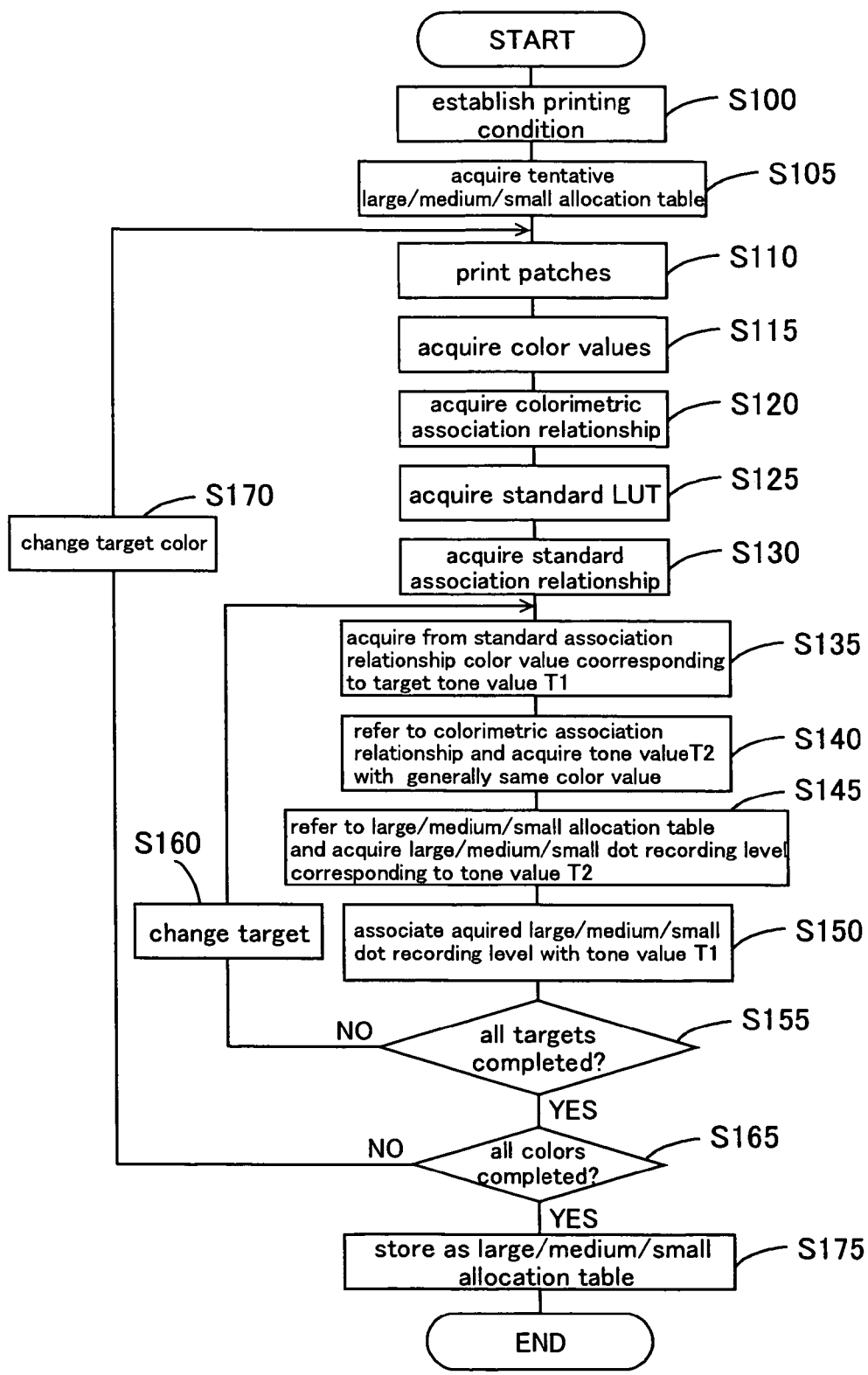
FIG. 6 is a recording level specifying data creation process flow.

(2-2 Large/Medium/Small Allocation Table Creation Process:

Next, on the basis of FIG. 6 and FIG. 3, the process for creating the large/medium/small allocation tables 126a, 126b with the APL 110 while making reference to the aforementioned standard LUT 122b and tentative large/medium/small allocation tables 124a, 124b will be described. FIG. 6 is the process flow by the APL 110; in Step S100, a printing condition is set via the aforementioned keyboard or other user interface. That is, a printing condition is specified when the created large/medium/small allocation tables are used. In this embodiment, either Resolution 2 or Resolution 3 is set.

The patch printing portion 112 is a module that generates data for patches to be subjected to color measurement, and prints them. In Step S105 the patch printing portion 112 extracts/acquires from the tentative large/medium/small allocation tables 124a, 124b data corresponding to the set printing condition. Since the data identifies large/medium/small dot recording levels for 33 tones out of 256 tones, print data for printing a predetermined patch at recording levels corresponding to the 33 tone values are created, and in Step S110, [the patches] are printed. The process in Step S110 corresponds to printing of patches under a predetermined printing condition.

Here, with any of the CMYKlclm [colors] as the target color targeted for processing, print data for printing patches for the target color is created and output to the USB I/F 130. As a result, 33 patches are printed for the target color by the printer 200. The color values of the printed patches are acquired by the color value acquiring portion 114. That is, the printed patches are subjected to color measurement by the colorimeter 300, and data indicating the color values thereof is input to the computer 100 via the USB I/F 130. Thereupon, in Step S155 the color value acquiring portion 114 acquires data indicating the color values. The process in this Step S115 corresponds to the process of acquiring patch color values.

In Step S120, the colorimetric association relationship acquiring portion 116b of the large/medium/small allocation table creating portion 116 acquires the association relationship between tone values and color values printed by the tone values. That is, the plurality of tone values acquired by the patch printing portion 112 and the color values acquired by the color value acquiring portion 114 are transferred to the colorimetric association relationship acquiring portion 116b, which associates the two with one another. Of course, in the color value acquiring portion 114, data is acquired such that it will be known in advance, for any tone value, which color value has been derived by color measurement of the printed result thereof. By means of the above arrangement, an association relationship among a plurality of tone values and color values can be acquired whereby in this embodiment the color value for any tone value can be calculated, so that fitting can be carried out by means of a predetermined multidimensional function.

Figure 7:
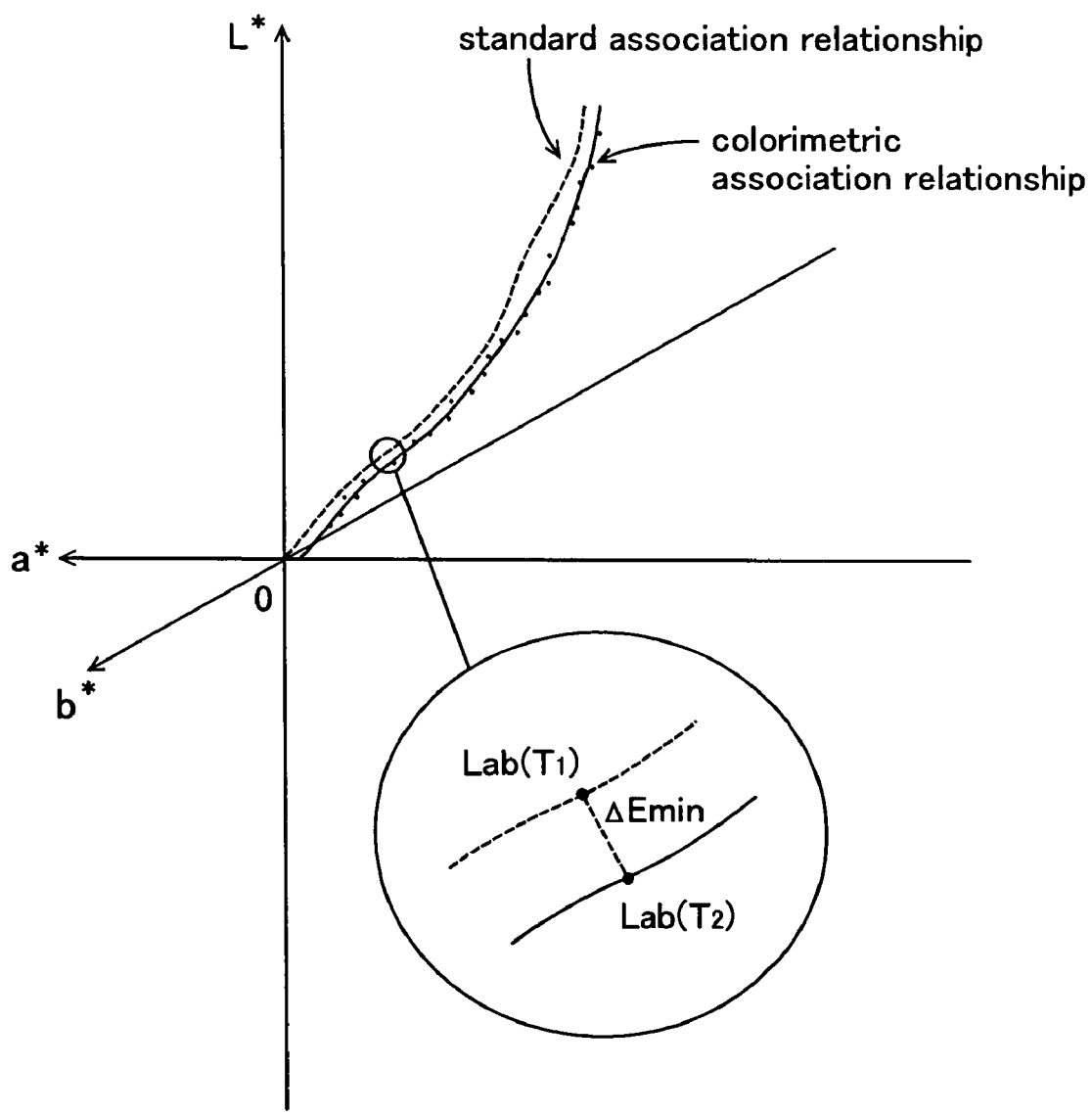
FIG. 7 is an illustration showing associations between a standard association relationship and a colorimetric association relationship.

This is depicted in FIG. 7. The drawing illustrates colorimetric values output in a specific color, shown plotted by black circles in the L*a*b* space. Of course, tone values specified in the tentative large/medium/small allocation tables are associated with the black circles. Color values derived by color measurement as represented by the black circles in the drawing are discrete values, and thus define a multidimensional function. For example, where there are defined a two-dimensional or higher function for giving L* value with tone value as a variable, a two-dimensional or higher function for giving a* value with tone value as a variable, and two-dimensional or higher function for giving b* value with tone value as a variable, the functions can be calculated by calculating the respective coefficients.

By so doing, for any tone value under the printing condition set in Step S100, where printed, a color value for it can be derived. In FIG. 7, the locus of the function (plotting color values for arbitrary tone values) is shown by a solid line. Herein, an association relationship between tone values and color values represented by a solid line is referred to as a colorimetric association relationship. Since large/medium/small dot recording levels associated with tone values are identified by the tentative large/medium/small allocation tables 124a, 124b, it may be said that color values and large/medium/small dot recording levels are associated.

Next, in the large/medium/small allocation table creating portion 116, the process of a standard association relationship acquiring portion 116a is carried out. The standard association relationship acquiring portion 116a is a module that acquires an association relationship of tone values and color values at the standard Resolution 1; in this embodiment, in Step S125 it acquires the aforementioned standard LUT 122b. Then in Step S130, referring to the standard LUT 122b, the color value for any tone value of a target color is acquired. Accordingly, the processes in Steps S125 and S130 correspond to a process of acquiring an association relationship among ink tone values and color values under a standard printing condition.

That is, by making reference to the standard LUT 122b, RGB image data corresponding to any CMYKlclm combination can be calculated, and the color values for it can be acquired thereby. Thus, by setting non-target color tone values to 0 while varying the target tone value between 0-255, and acquiring the corresponding color value, the color value for any tone value can be acquired. In FIG. 7, color values for arbitrary tone values are shown by the broken line. Herein, the association relationship indicated by the broken line is referred to as the standard association relationship.

The standard association relationship gives color values to be output by CMYKlclm tone values. Accordingly, in the present invention, even where printing is executed after conversion with the large/medium/small allocation tables 126a, 126b corresponding to Resolution 2 and Resolution 3, it suffices to create large/medium/small allocation tables 126a, 126b such that color values are indicated in the standard association relationship by tone values. Thus, a recording level/tone value associating portion 116c refers to the standard association relationship and the colorimetric association relationship, and in Steps S135-S150 performs a process to associate large/medium/small dots with a plurality of target tone values.

At bottom in FIG. 7 is shown an example of this process, with a portion of the L*a*b* space shown enlarged. In Step S135, a particular target tone value $T_1$ is specified, and making reference to the standard association relationship, a color value corresponding to the target tone value $T_1$ (Lab ($T_1$) in FIG. 7) is acquired. Next, in Step S140, referring to the aforementioned colorimetric association relationship, there is acquired a tone value $T_2$ corresponding to a color value generally the same as the acquired color value (Lab ($T_2$) in FIG. 7).

In FIG. 7, when the broken line representing the standard association relationship and the solid line representing the colorimetric association relationship in FIG. 7 intersect one another, the color value Lab ($T_1$) and the color value Lab ($T_2$) will be the same color value. On the other hand, where they do not intersect, there is selected from among color values representing the colorimetric association relationship the color value Lab ($T_2$) having the smallest color difference $\Delta E$ from the color value Lab ($T_1$). By means of the above process, the color indicated by the target tone value $T_1$ of the tentative large/medium/small allocation tables acquired in the aforementioned Step S105 and the tone value $T_2$ needed to output generally identical color is identified.

Thus, in Step S145, referring to the tentative large/medium/small allocation tables acquired in the aforementioned Step S105, the large/medium/small recording level corresponding to the aforementioned tone value $T_2$ is acquired.

Since the large/medium/small recording level is a recording level for outputting color generally identical to the color indicated by the target tone value $T_1$, in Step S150, the large/medium/small recording level and the target tone value $T_1$ are associated with one another.

When association of one target tone value $T_1$ with a large/medium/small recording level has been completed, in Step S155 it is determined whether processing has been completed for all targets to be stored as large/medium/small allocation tables. If in Step S155 it is not determined that processing has been completed for all targets, in Step S160, an unprocessed tone value is taken as the new target, and the process beginning with Step S135 is repeated. As a result of the above, there is created a table that associates a plurality of tone values and large/medium/small recording levels for target colors.

In Step S165, it is determined whether processing has been completed for all CMYKlclm colors as target colors, and if it is not determined that processing has been completed for all colors, in Step S170 an unprocessed color is selected as the target color, and the process beginning with Step S170 is repeated. If in Step S165 it is determined that processing has been completed for all colors, the derived data is designated as the large/medium/small allocation table 126a or 126b, and in Step S175 is recorded on the HDD 120. That is, data that associates a plurality of target tone values with large/medium/small recording levels for each color are stored as large/medium/small allocation tables. In this embodiment, the large/medium/small allocation tables are the aforementioned recording level specifying data, and Steps S120 and S135-S165 correspond to the process of creating recording level specifying data.

By carrying out the above processes for each printing condition, large/medium/small allocation tables 126a, 126b for carrying out color matching under each printing condition can be created while appropriating the standard LUT 122b used to perform color matching under the standard printing condition (Resolution 1). Also, in the present invention, it suffices to create large/medium/small allocation tables such that color matching can be carried out for each printing condition; with this proviso, process procedures different from that shown in FIG. 6 may be employed. For example, the order of the process carried out by the standard association relationship acquiring portion 116a and the process carried out by the colorimetric association relationship acquiring portion 116b may be reversed.

Figure 8:
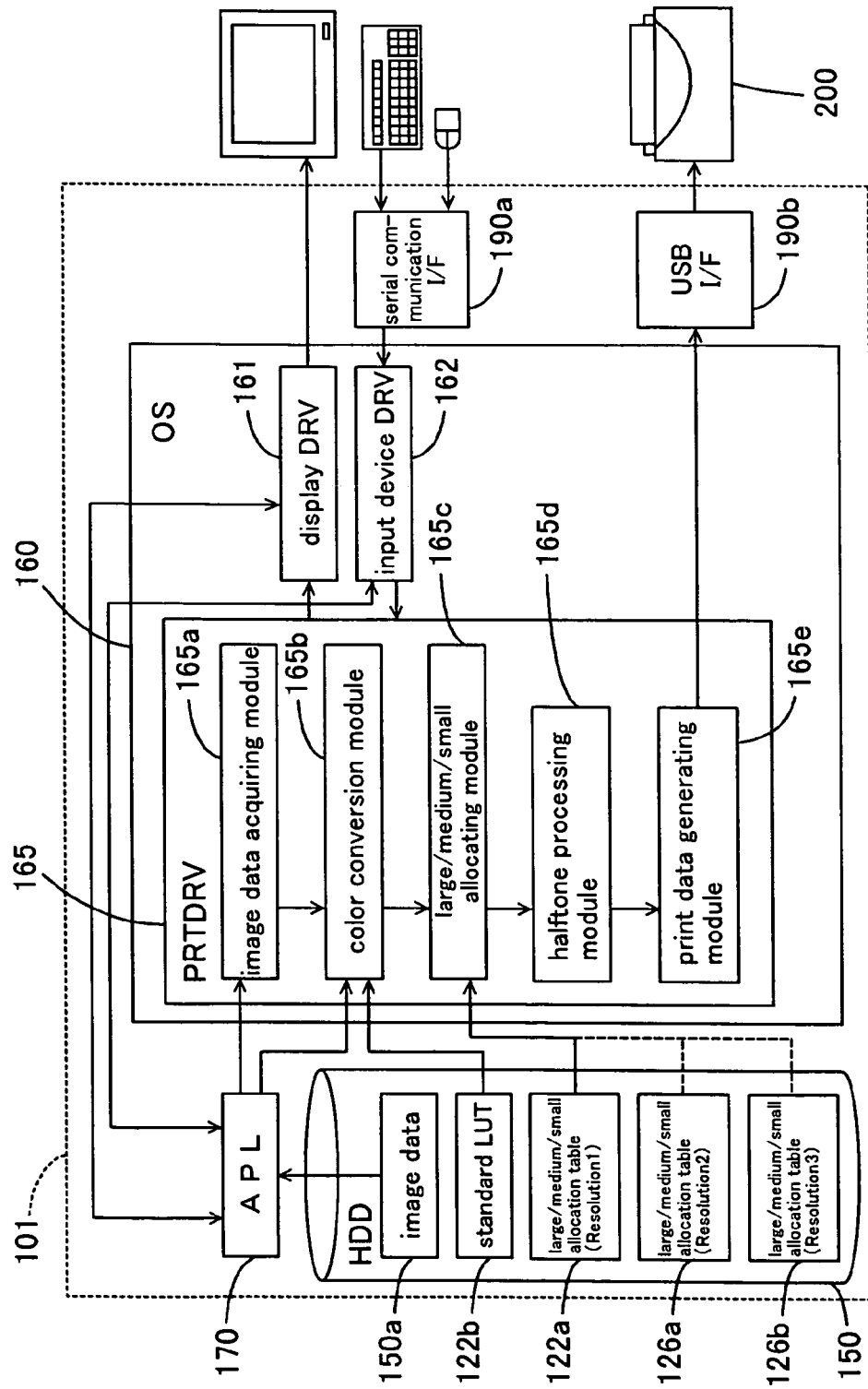
FIG. 8 is a block diagram of a computer that uses large/medium/small allocation tables.

(3) Other Working Examples:

The large/medium/small allocation tables 126a, 126b created in the above manner, and the aforementioned standard LUT 122b and large/medium/small allocation table 122a may be used in printing processes carried out generally by general-purpose computers. FIG. 8 is a block diagram showing a configuration example of a computer that uses large/medium/small allocation tables 126a, 126b etc. when printing. The computer 101 is a general-purpose personal computer whose OS 160 has an installed printer driver (PRTDRV) 165, input device driver (DRV) 162, and display driver (DRV) 161. Like the computer 100 mentioned earlier, the computer 101 has a CPU, RAM, ROM or other program execution environment, these devices being capable of executing programs. The display DRV 161 is a driver for controlling the display of image data and the like on a display; the input device DRV 162 is a driver that receives code signals input from the keyboard or mouse via a serial communication I/F 190a, and handles predetermined input operations.

APL 170 is an application program able to execute color image retouching or the like; with the APL 170 running, the user can operate the aforementioned operation input device to make the printer 200 print out the color image. The printer 200 is a machine similar to the printer of FIG. 3. During printing of a color image in this way, reference is made to large/medium/small allocation tables created in accordance with the present invention. Image data for color images created by the APL 170 is dot matrix data providing tone representation of RGB color components, and is recorded onto the HDD 150. Here, the image data 150a is data based on the sRGB standard.

In order for the aforementioned PRTDRV 165 to execute printing, it is provided with an image data acquiring module 165a, a color conversion module 165b, a large/medium/small allocating module 165c, a halftone processing module 165d, and a print data generating module 165e. With the APL 170 running, when the user sets a selected printing condition (in the example shown in FIG. 8, any of Resolutions 1-3) and issues a Print command, image data 150a representing the image targeted for printing is acquired by the image data acquiring module 165a, whereupon the image data acquiring module 165a runs the color conversion module 165b. The color conversion module 165b is a module that converts sRGB tone values to CMYKlclm tone values, and refers to the standard LUT 122b when converting sRGB tone values to CMYKlclm tone values by means of interpolation.

The large/medium/small allocating module 165c, on the basis of color-converted CMYKlclm tone values, effects conversion to data indicating large/medium/small dot recording level for each color. That is, from among the large/medium/small allocation modules 122a, 126a, 126b, it selected data matching the printing condition that was set when the aforementioned Print command was issues. Since this large/medium/small allocation module associates CMYKlclm tone values with recording levels for large, medium, and small dots respectively, for a plurality of reference values, interpolation calculations can be performed as needed to acquire large/medium/small dot recording levels corresponding to the aforementioned CMYKlclm tone values.

Once large/medium/small dot recording levels have been acquired, the data is handed off to the aforementioned halftone processing module 165d. The halftone processing module 165d is a module that performs halftone processing in order to convert large/medium/small dots of each color so that these are represented in terms of recording density of ink drops; the module generates data for recording large/medium/small drops at the converted recording density. Once the print data generating module 165e has received this data, it performs a sorting process to sort the data in the order in which it will be used by the printer 200. After this sorting process, predetermined information such as the image resolution is appended to create print data, which is then output to the printer 200 via the USB I/F 190a. In the printer 200, the image displayed on the display on the basis of the print data is printed out.

In this printing process, since allocation to large/medium/small dots is carried out with reference to large/medium/small allocation tables created for each printing condition, color matching can be carried out accurately for each printing condition. The above description pertains to a very general-purpose printing process by the PRTDRV 165 that controls a printer capable of recording N types of ink drops. Accordingly; color matching can be carried out simply by enabling the use of large/medium/small allocation tables created in accordance with the invention, in combination with a standard LUT, so that highly accurate color matching can be achieved without any change in hardware configuration on most printers, and with fewer resources. Additionally, the need for a LUT for each printing condition, used in conventional printing processes, is obviated altogether, with the standard LUT 122b being the only LUT required.

In the present invention, it suffices to have an arrangement whereby color matching is carried out by appropriating the LUT of a standard printing and creating large/medium/small allocation tables for any printing condition; various examples other than the embodiments hereinabove could be employed instead. For example, whereas in the preceding embodiment, when creating the large/medium/small allocation tables, the standard association relationship and colorimetric association relationship are compared in the L*a*b* space as shown in FIG. 7, but a more simple arrangement could be employed instead.

Specifically, the standard association relationship and calorimetric association relationship may compared in terms of any of the L*a*b* components only. Of course, the color components which are compared may vary by ink color. By means of this arrangement, target tone values and large/medium/small dot recording levels can be associated by means of very simple calculations. Also, for printing conditions that lie between a number of printing conditions, association can be made by means of interpolation.

For example, in a printer enabling selection of a large number of values for resolution, it will be acceptable to create large/medium/small allocation tables for a number of resolutions, and for a printing condition that lies between a number of printing conditions, to calculate the large/medium/small dot recording level therefore from large/medium/small dot recording levels in large/medium/small allocation tables created already. By means of this arrangement, color matching can be carried out with few resources, for a greater number of printing conditions.

Also, whereas the large/medium/small allocation tables 126a, 126b described previously associate target tone values and large/medium/small dot recording levels for the colors CMYKlclm, association relationships of tone values with recording levels could be common to some or all colors. For example, as the pattern of change in lightness for the dark inks, namely C and M inks, is generally the same, an arrangement whereby common large/medium/small allocation tables are used for these could be employed. Of course, common large/medium/small allocation tables could be employed for more colors, or for all colors. However, by creating large/medium/small allocation tables for each printing condition, it is possible to carry out color matching with high accuracy, as compared to an arrangement utilizing common large/medium/small allocation tables for all printing conditions.

Target tone values held in the form of large/medium/small allocation tables may be values derived by uniform division of a tone value range, or may have varying distribution density depending on the tone value range. For example, typically, greater ink recording levels (i.e. greater tone values) are associated with slower change in color value with respect to change in unit ink recording level. Accordingly, by increasing ink recording levels in the tone value range representing low ink recording levels, it is possible to correctly represent change in lightness. Thus it would also be acceptable to employ greater target tone values for lower ink recording level tone values. By means of this arrangement, change in lightness can be represented correctly at low ink recording levels. Of course, target tone values may be made non-uniform on the basis of various other criteria as well.

Figure 9:
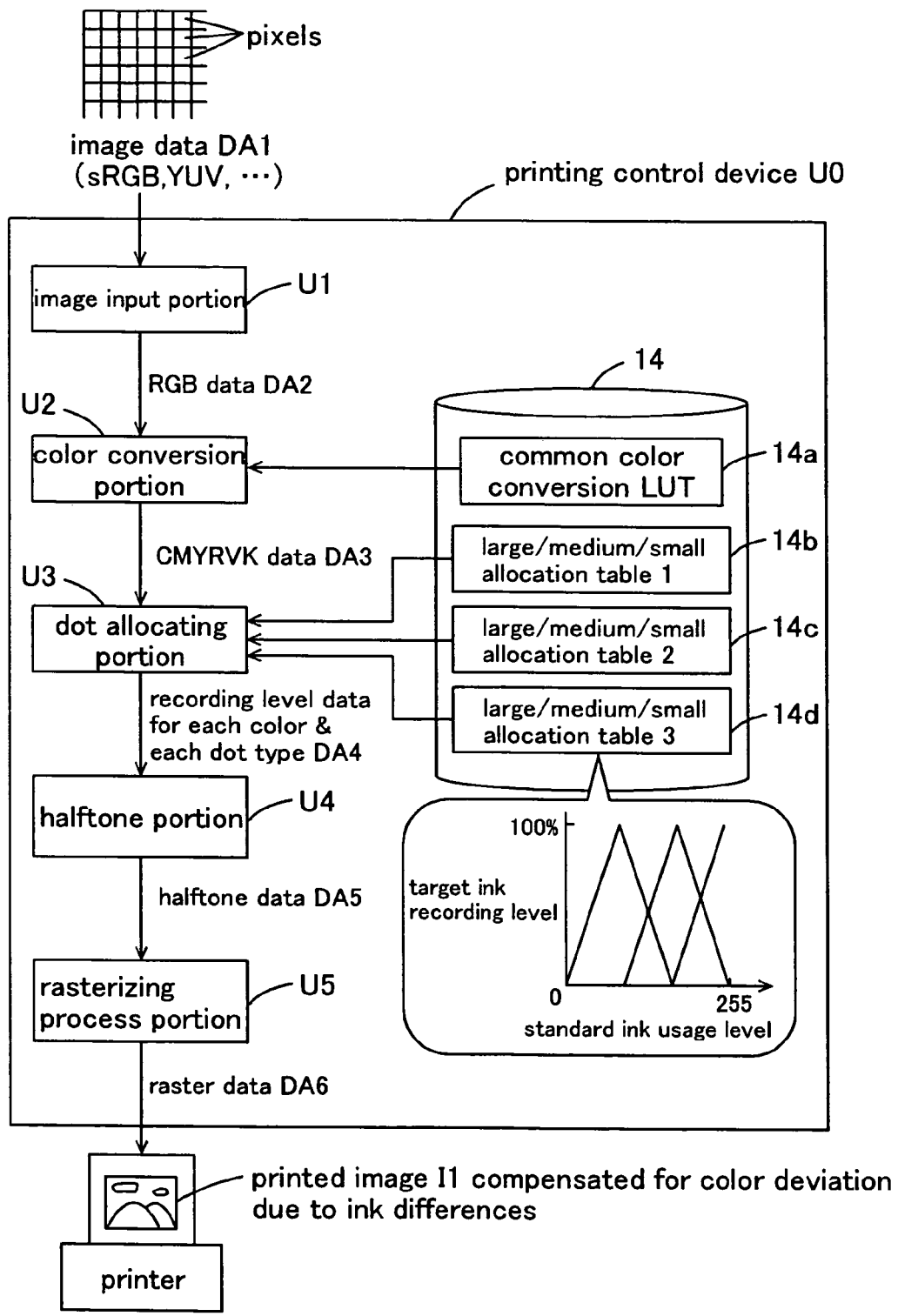
FIG. 9 is a model depiction of the arrangement of a printing control device
Figure 10:
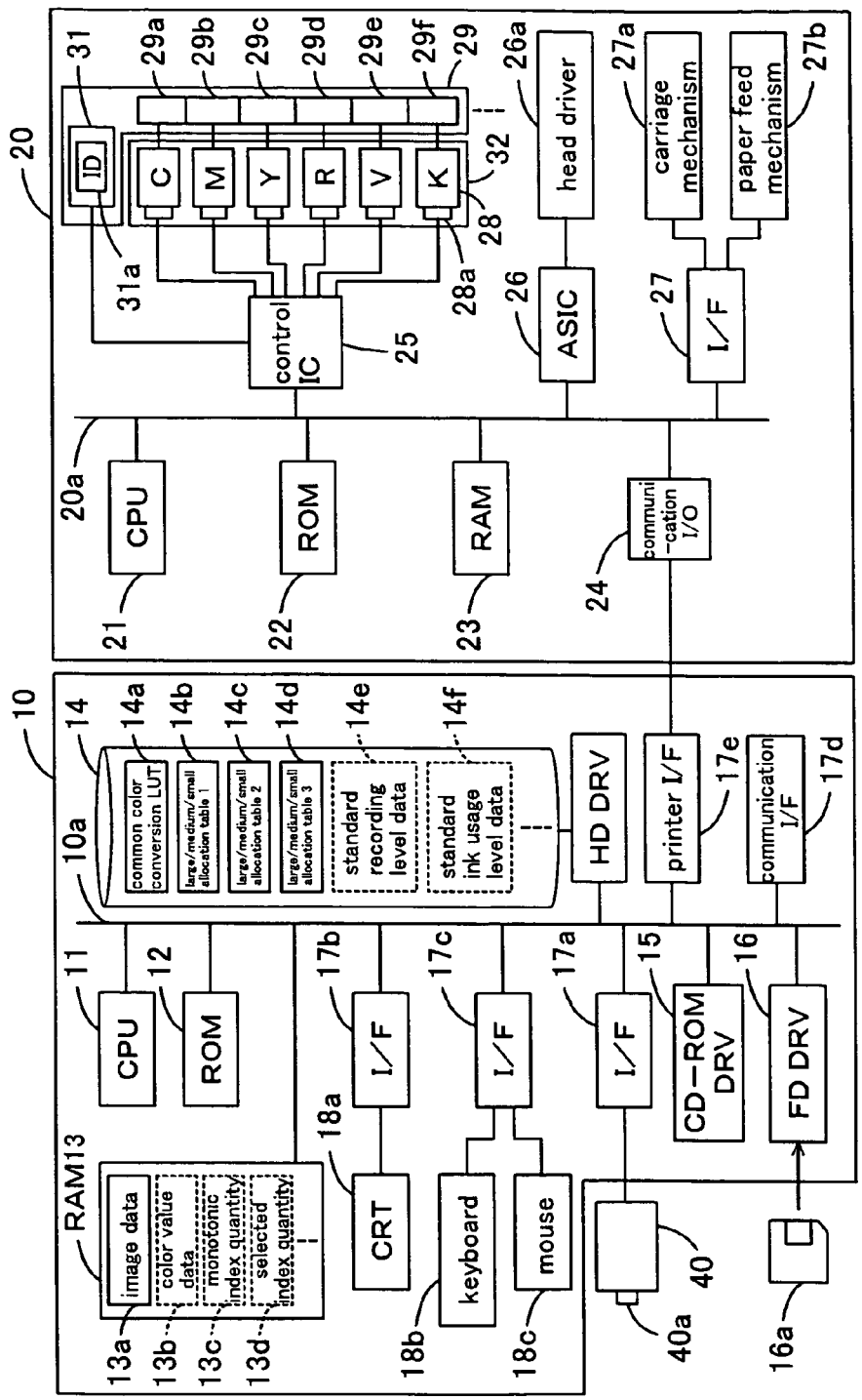
FIG. 10 is a block diagram showing the arrangement of a printing system.
Figure 11:
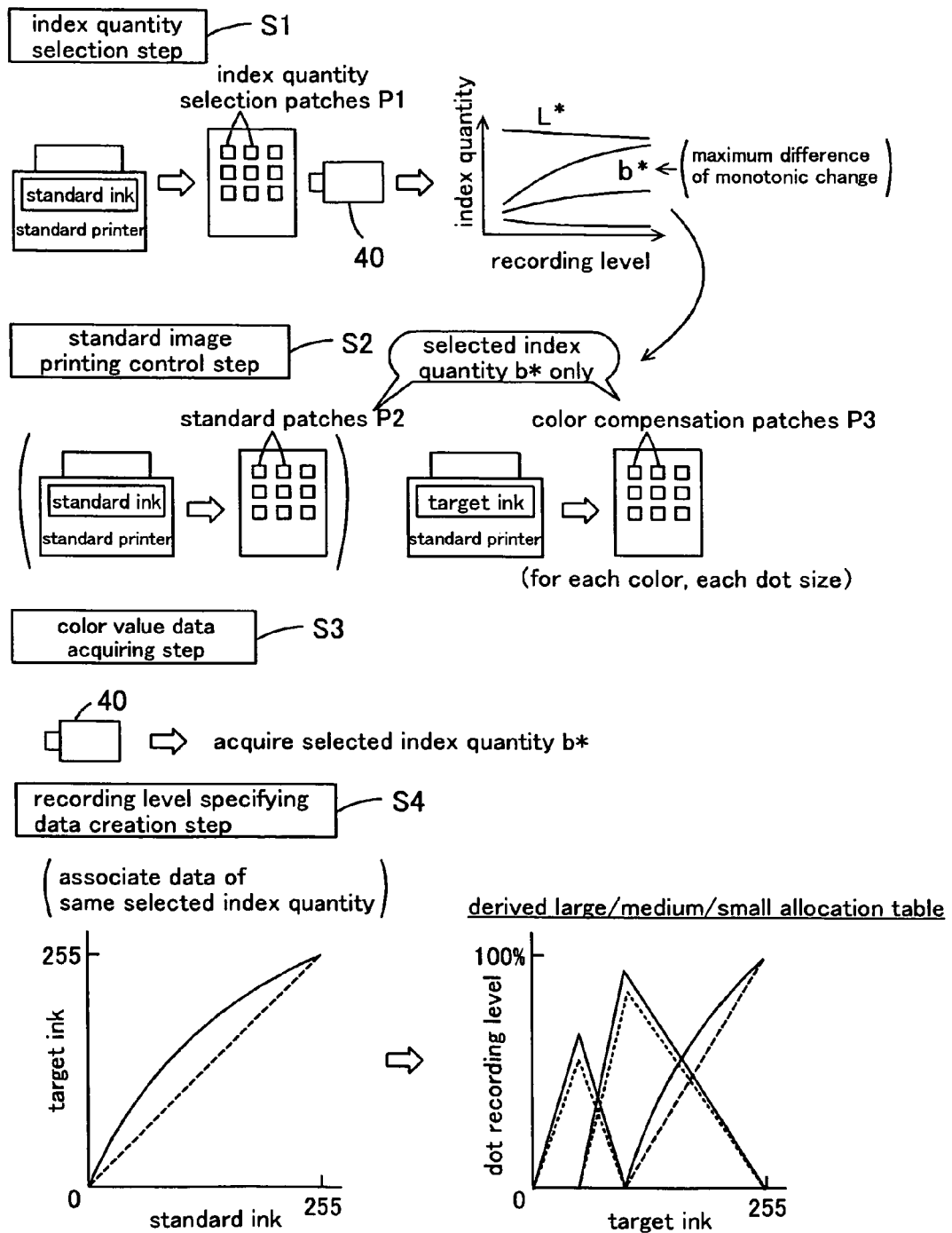
FIG. 11 is a model depiction of a recording level specifying data creation method.

(4) Arrangement of Printing System and Recording Level Specifying Data Creation Device in Embodiment 2:

FIG. 9 is a model depiction of the arrangement of a printing control device U0 in an embodiment of the invention; and FIG. 10 shows a printing system composed inter alia of a computer 10 serving as the printing control device and recording level specifying data creating device of the invention, and an ink-jet printer 20 capable of color printing, as the printing device (printing means). FIG. 11 is a model depiction of a recording level specifying data creation method.

In the computer 10, the CPU 11 controls the entire computer via a system bus 10a. To the bus 10a are connected ROM 12, RAM 13, a CD-ROM drive 15, a flexible disk (FD) drive 16, and various interfaces (I/F) 17a-e; also connected is a hard disk (HD) 14, which is a magnetic disk connected via a hard disk drive. Image data 13a and the like is stored temporarily in RAM 13. In the case of a printing system that includes a recording level specifying data creating device, color value data 13b, and data representing monotonic index quantity and selected index quantity 13c, d is stored in RAM 13 on a temporary basis.

On the HD 14 are stored an operating system (OS) application programs (APL) and the like, which during execution are transferred as needed to RAM 13 by the CPU 11, and executed. In the case of a printing system that includes the printing control device of the present invention, the HD 14 will have stored (recorded), in predetermined memory areas (data recording areas) thereof, the color conversion table of the invention, namely, color conversion LUT 14a, large/medium/small allocation tables (recording level specifying data) 14b-d, various threshold values, and the like. A digital camera 50 or the like may be connected to the I/F 17a (e.g. USB I/F).

In the case of a printing system that includes a recording level specifying data creating device, there will also be recorded on the HD 14 a color correction program, standard recording level data 14e, standard ink usage level data 14f, various threshold values, and the like. In this case, a colorimeter 40 will be connected to the I/F 17a. This calorimeter 40, by directing a sensor portion 40a towards the target being subjected to color measurement, is able to acquire, as color component levels (color values) a plurality of color components L, a, b based on the CIE (1976) standard Lab color system, and to output the acquired color component levels L, a, b to the computer 10. Here, the CIE Lab color space (predetermined color space) is a device-independent uniform color space having a plurality of color components L, a, b as color component levels. L represents luminance (brightness), and a and b are color coordinates representing hue and saturation. Of course, the color space for color measurement could instead be the CIE XYZ color space, the CIE Luv color space, the RGB color space, or the like.

A display 18a for displaying images corresponding to color image data on the basis of the data is connected to a CRT I/F 17b; a keyboard 18b and mouse 18b are connected as control input devices to an input I/F 17c, and a printer 20 is connected to a printer I/F 17e via a serial I/F cable, for example.

From an ink head with inks of six colors contained in six ink cartridges provided corresponding respectively to the colors CMYRVK (cyan, magenta, yellow, red, violet, black), the printer 20 ejects ink onto printing paper (printing medium) to produce dots, in order to print a printed image corresponding to print data representing a color image. Of course, a printer that uses light cyan, light magenta, light black, dark yellow, unpigmented ink, or the like could be employed instead, as could a printer that does not use any of the inks CMYRVK. It is also possible to employ other printing devices of various kinds, such as a bubble type printer that generated bubbles in ink passages in order to eject ink, or a laser print that uses toner ink to print a printed image onto a printing medium. Inks used by such printing devices may be liquid or solid. The inks in this embodiment are inks containing color matter consisting of finely divided pigment mixed with an aqueous solvent, but could instead be inks containing dye-based coloring agents, or inks using oil-based solvents.

In the printer 20, a CPU 21, ROM 22, RAM 23, a communications I/O 24, a control IC 25, an ASIC 26, an I/F 27 and the like are connected via a bus 20a, with the parts being controlled by the CPU 21 according to a program written to ROM 22.

On a carriage which is reciprocated in the main scanning direction by a carriage mechanism 27a is disposed a cartridge holder 32 into which ink cartridges 28 may be installed at predetermined installation locations, as well as an on-board print head unit (print head group) 29. The holder 32 of this embodiment has formed therein six installation locations corresponding respectively to all six types of inks. The ink cartridges 28 have formed therein predetermined filling chambers that can be filled with ink of corresponding color. When ink cartridges 28 of types corresponding to the installation locations in the holder have been installed, the filling chambers inside the ink cartridges constitute the "predetermined loading locations" referred to in the invention.

The print head unit 29 comprises EEPROM 31 and print heads 29a-f provided for each of the six types of ink CMYRVK. In this memory 31 there may recorded, for example, color adjustment ID (error information) 31a used for compensating for error in ink ejection level relative to a standard machine. The print heads 29a-f installed in the printer can eject inks of the corresponding colors onto printing paper; the printer 20 forms dots on the printing paper using the print heads 29a-f corresponding to each color of ink, to print a printed image.

The cartridges 28 may each be furnished with a memory chip 28a of RAM or the like, with the memory chips 28a being connected electrically to the control IC 25.

The communications I/O 24 is connected to the printer I/F 17e of the computer 10; the printer 20 receives raster data on a per-color basis sent from the computer 10 via the communications I/O 24. The ASIC 26 exchanges predetermined signals with the CPU 21 while outputting print voltage data corresponding to raster data, to a head driver 26a. The head driver 26a generates from the print voltage data a print voltage pattern for piezo elements which are embedded in the print heads 29a-f, causing the print heads 29a-f to eject inks of the six colors in dot units. The carriage mechanism 27a and a paper feed mechanism connected to the I/F 27 perform main scanning of the print head unit 29, and sub-scanning by sequentially advancing the printing paper while performing page break operations at appropriate intervals.

The print heads 29a-f are equipped with a plurality of ink jet nozzles for each color, with corresponding piezo elements disposed in the nozzles.

Figure 12:
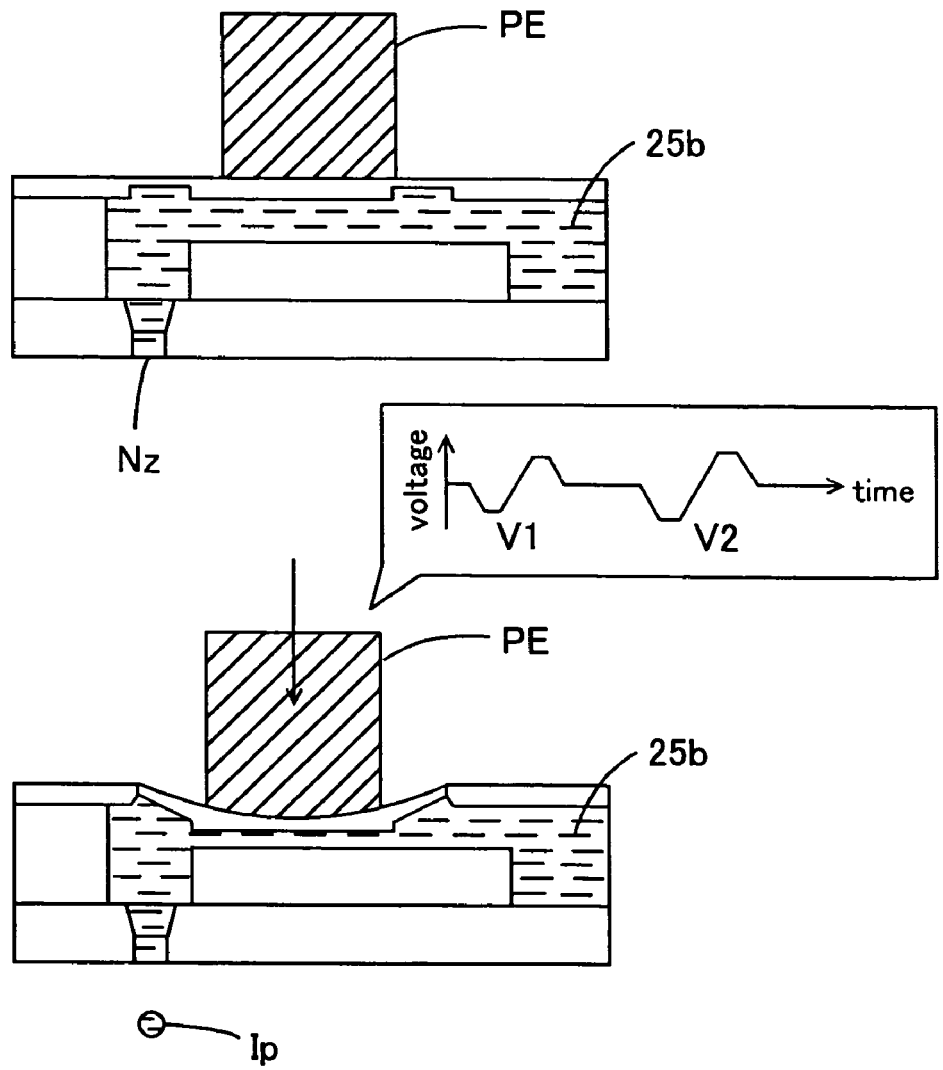
FIG. 12 is an enlarged view of the nozzle and its internal structure.

As shown in FIG. 12, a piezo element PE, disposed at a location contacting an ink passage 25b that guides ink to a nozzle Nz, expands when voltage is applied across electrodes disposed at both ends of the element, causing one side wall of the ink passage to deform. Thereupon, ink in an amount corresponding to the extent of the constriction of the ink passage forms an ink drop Ip, which is ejected from the distal end of nozzle Nz and penetrates into the printing medium to produce a dot, to carry out printing. The greater the voltage difference of the drive waveform of the print voltage, the larger the dot.

The printer 20 is capable of recording onto the printing medium dots of three types (two or more types), namely large/medium/small, containing different levels of ink (e.g. ink drop weight; ink drop volume would be acceptable as well); from a given ink head for each color, ink is ejected in a plurality of different ink levels to produce dots of size corresponding to the plurality of different ink levels. The raster data sent by the computer to the printer has appended thereto identifying information for identifying the type of dots of three types (multiple types), with the printer recording dots of type corresponding to the identifying information. When raster data consisting of dot data that represents dot type for each raster is input, the printer forms on the printing medium N types of ink drops of different ink levels corresponding to the raster data.

On the computer 10, the OS includes a printer driver or the like that controls the printer I/F 17e, and that executes various kinds of control. The APL exchanges data and the like with hardware via the OS. The printer driver runs during execution of the APL printing function, and is capable of bidirectional communication with the printer 20 via the printer I/F 17e; it handles data from the APL via the OS, converts it to raster data, and sends it to the printer 20.

The printing control program of the present invention may be composed of either the OS or APL, or the OS and the APL. The medium on which the program is recorded could be a CD-ROM, FD 16a, semiconductor memory or the like instead of the hard disk 14. Alternatively, the communications I/F 17d could be connected to the Internet, and the program of the invention downloaded from a predetermined server, and executed.

The printing control device U0 shown in FIG. 9 comprises an HD 14 having data recording areas, and portions U1-U5. On the HD 14 are stored a color conversion LUT 14a used in common irrespective of CMYRVK ink set (ink combination) used simultaneously by the printer 20, and large/medium/small allocation tables (in the drawing, the three types 14b-d) provided for each ink set.

The image input portion U1 inputs image data DA1 and converts it to RGB data (first image data) DA2 that gives tone representation of an image with a plurality of pixels for each [color] RGB. The color conversion portion U2 refers to the color conversion LUT 14a stored on the HD, and performs color conversion of the RGB data DA2 into CMYRVK data (tone values for each ink color) DA3 that gives tone representation of an image with a plurality of pixels for each [of the colors] CMYRVK. The dot allocating portion U3 refers to the large/medium/small allocation table that, of the large/medium/small allocation tables 14b-d stored on the HD, corresponds to the ink set used by the printer 20; effects conversion from tone values for each ink color for each [of the colors] CMYRVK representing usage level of ink used by the printer 20 for each pixel making up the CMYRVK data DA3, into values for each [color] CMYRVK representing recording level for the three types of dots, for each type; and creates recording level data DA4 for each of the colors CMYRVK and for each dot size. The halftone portion U4 performs a predetermined halftone process on the recording level data DA4, to create halftone data DA5 for each color and for each dot size. The rasterizing process portion U5 performs a rasterizing process on the halftone data DA5, to create raster data DA6 for each color and for each dot size, which is then sent to the printer. By means of the processes carried out by these portions U4, U5, control to make the printer print out image data corresponding to the recording level data D4 is carried out.

As shown in FIG. 13, large/medium/small allocation tables TA1-TA3 are information tables that specify, for each [of the colors] CMYRMK, association relationships for tone values D1-D3 for each ink color representing usage levels of inks used by the printer 20, with recording levels D4-D6 representing recording level s of ink drops on a per-dot type basis.

In this embodiment, the standard large/medium/small allocation table TA1 for reference when using CMYRVK standard ink designated as standard is stored in memory on HD14 as a large/medium/small allocation table 14b; and the derived large/medium/small allocation tables TA2, TA3 for reference when using CMYRVK derived ink (the aforementioned target ink) derived from standard ink are stored in memory on HD14 as large/medium/small allocation tables 14c and d. Here, tone values D1-D3 for each ink color are all data in which standard ink usage levels are represented.

(5) Recording Level Specifying Data Creation Method and Creation Process:

With the recording level specifying data creation method of this embodiment depicted in FIG. 11, Steps S1-S4 are carried out sequentially, to create derived large/medium/small allocation tables from the standard large/medium/small allocation table, so as to compensate, for each of N types of ink drops, color deviation of a standard image printed on a printing medium at standard ink drop recording levels when using standard ink, and a standard image printed on a printing medium at standard ink drop recording levels when using the aforementioned target ink.

First, making reference to the flowchart shown in FIG. 14, the process by which the recording level specifying data creating device creates a standard large/medium/small allocation table will be described. In this embodiment, substituting the largest dot having the largest ink level (large dot) with dots of other ink levels (small and medium dots), ink drop recording levels for each dot type are determined, the process being carried out for each of the colors CMYRVK. First, an ink color targeted for data creation from among the six colors CMYRVK is set by means of updating the pointer etc., and for this target ink color there is created correlation data representing correlation between recording level (tone value) of each of the N types of ink drops and luminance on a predetermined printing medium, which data is displayed as a graph (Step S1105. Description of steps will be omitted hereinafter.) Where large/medium/small allocation tables are created for each type of printing medium, a solid color patch (standard image; also termed a color chip.) is printed with recording levels of standard ink drops of multiple stages on a target printing medium for creating large/medium/small allocation tables, and the luminance L is acquired by means of color measurement in a predetermined color space such as the CIE Lab color space, the luminance L being associated with ink drop recording levels to produce the correlation data.

Figure 15:
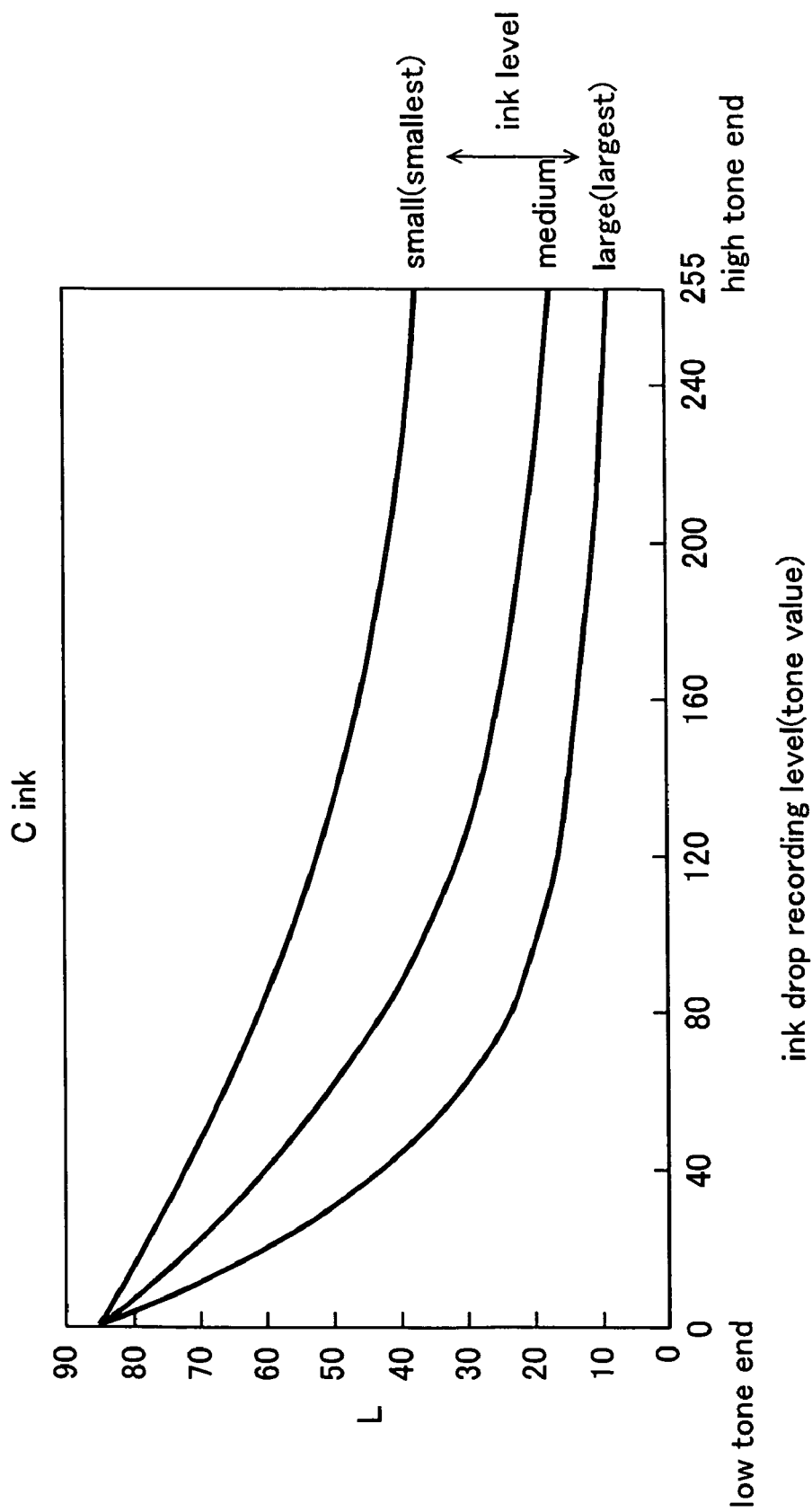
FIG. 15 is a graph format giving correlation data for ink drop recording level and lightness.

FIG. 15 is a graph format giving correlation data for ink drop recording level and lightness; the horizontal axis gives ink drop recording level, and the vertical axis gives luminance L ($0 \leq L \leq 100$). Luminance L denotes luminance in the device-independent, uniform CIE Lab color space (the CIE Luv color space would also be possible). For example, while luminance L can be calculated from tristimulus values Y in the CIE XYZ color system (also specified in JIS Z8701) and the value $Y_n$ of Y by a standard illuminant from a perfect reflecting diffuser, luminance L may also be calculated from tristimulus values $Y_{10}$ in the CIE $X_{10}Y_{10}Z_{10}$ color system and the value $Y_n$ of $Y_{10}$ by a standard illuminant from a perfect reflecting diffuser, or the like.

Ink drop recording level specifies, in terms of tone values of 0 (0% dot recording rate) to 255 (100% dot recording rate), the condition of recording of dots, from a condition in which dots are not recorded to the upper limit of the duty limit (ink level limit) per unit of area. Dot size is denoted on the curves in the graph. Ink drop recording level is proportional to dot recording rate; dividing ink drop recording level by the maximum tone value of 255 gives the dot recording rate. In actual practice, it is possible to create image data representing patches at each ink drop recording level for the three types of dots; to create and output to the printer raster data having undergone the halftone process and rasterizing process; and to then acquire color measurement results for patches printed onto a predetermined printing medium, associating ink drop recording level with luminance to create a graph. Here, the operator can acquire the color measurement results with the computer 10, by connecting to the computer 10 a colorimeter capable of measuring luminance L, and sequentially placing the sensor of the colorimeter against the patches to take color measurements.

As shown in the drawing, the dot luminance range is narrowest for the smallest dot (small dot) having the lowest ink level, and spreads out as ink level increases. The graph of each type of dot is convex towards the bottom, with the rate of change in luminance with the largest dot being greatest at low ink recording levels, and the rate of change in luminance decreasing with lower ink level. For colors besides C as well, the trend is the same despite some differences.

Next, recording level of each type of dot, with the exception of the largest dot, is divided by a parameter X (X>1), to derive a parameter Xc that best coincides with the correlation of the largest dot (Step S1110). In the graph of FIG. 15, ink drop recording level is divided by X and made coincident with the graph of the largest dot.

Figure 16:
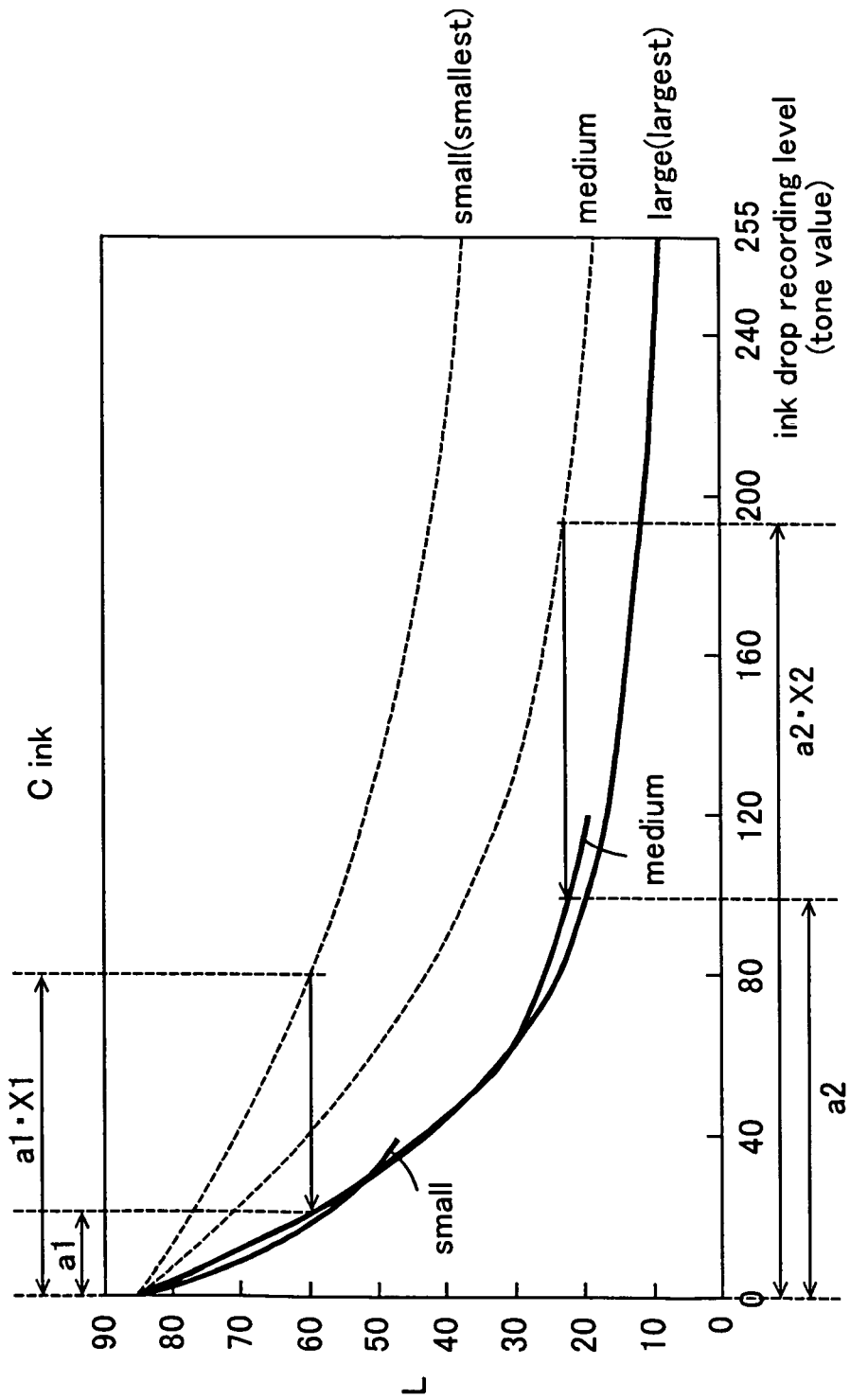
FIG. 16 is a diagram showing small and medium dot graphs made coincident with a large dot graph.

FIG. 16 is a diagram showing small and medium dot graphs made coincident with a large dot graph by dividing of ink drop recording levels by the parameter X. In the drawing, the horizontal axis gives ink drop recording level and the vertical axis gives luminance L; graphs of ink drop recording levels prior to division by the parameter X are indicated by broken lines. By dividing ink drop recording level by the parameter X, the broken lines on the graph shrink leftward, so that by adjusting X, the change in luminance of the other dots can be made to coincide with a portion of the change in luminance of the large dot.

In the case of a small dot, when the change in luminance of the small dot is divided by the parameter X1 to make it coincide with the change in luminance of the large dot, the ratio of ink drop recording level before and after division for a given luminance value is a1·X1:a1(0<a1<255). The setting for parameter X1 may be determined, for example, by sequentially increasing the setting starting at a value greater than 1, at each setting calculating a value which is summation of the absolute values of difference from the luminance values at each ink drop recording level, and choosing the setting that gives the smallest such value.

The above process determines, for small and medium dots excepting the largest dot, parameters X1c, X2c that best coincide with correlation data of the largest dot. The resultant parameter Xc represents recording levels of other dots substituted for the largest dot, so if a one largest dot is substituted by Xc other dots, substitution can be carried out so as to compensate for differences in dot ink levels.

In the case of a medium dot, when the change in luminance of the medium dot is divided by the parameter X2 to make it coincide with the change in luminance of the large dot, the ratio of ink drop recording level before and after division for a given luminance value is a2·X2:a1(a1<a2<255).

After completing Step S1110, first there is created correlation data representing correlation between tone values for each ink color and ink drop recording level, for the largest dot only. Tone values for each ink color are tone values that make up the color-converted CMYRVK data representing ink usage levels used by the printed, and are values given on a per-ink color basis.

Figure 17:
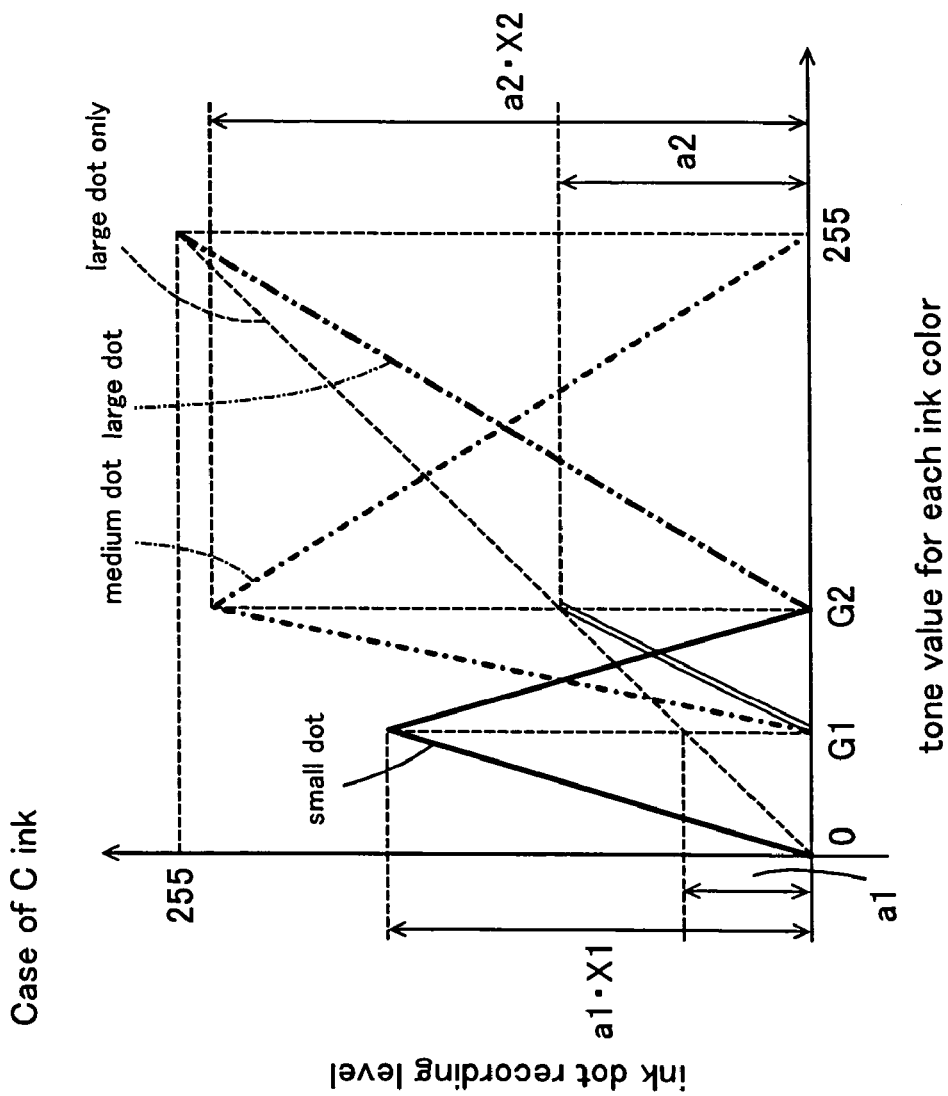
FIG. 17 is a diagram showing association relationships between tone values for each ink color and recording levels of N types of ink drops.

FIG. 17 is a graph format showing association relationships between tone values for each ink color and recording levels of N types of ink drops, in the case of C ink. In the drawing, the horizontal axis gives tone value for each ink color, and the vertical axis gives ink drop recording level (tone value). The graph is similar in the case of MYRVK as well, and a similar table can be created. As shown by the broken lines in the figure, for the largest dot only, there is created correlation data wherein the correlation is one in which, as tone value for each ink color increases in linear (straight line) fashion from 0 to 255, ink drop recording level increases in linear fashion (proportionally) from 0 to 255.

Subsequently, a process to allocate the largest dot recording level to other dot recording levels is performed (Step S1120). Here, to arrive at the tone values G1, G2 for each color at which the small and medium dot recording levels reach their respective maximums, standard luminance Ld at a predetermined ink drop recording level Gd (0<Gd<225, preferably 128<Gd<255) can be acquired on a per-type basis for the small and medium dots from correlation data of dots corresponding to each type, selecting the ink drop recording level at which correlation data of the largest dot has the same standard luminance Ld.

For a small dot, since the substitution ratio has been determined as a1·X1:a1, the ink drop recording level versus the large dot recording level a1 is a1·X1. Since the correlation of the large dot only, indicated by the broken line, is a straight line with a slope of 1, for the small dot, it will be a straight line of slope X1. Thus, with the small dot, a straight line of slope X1 is used for per-ink color tone values 0-G1, and a straight line of slope −X1·G1/(G2−G1) is used for per-ink color tone values G1-G2. As a result, for the per-ink color tone values 0-G1, the recording level for the largest dot is 0; and for the per-ink color tone values G1-G2, the recording level is that indicated by the double lines in the figure.

Next, the recording level of the largest dot after small dot allocation (indicated by the double lines) at per-ink color tone values G1-G2 is replaced with a medium dot recording level. Assuming that the medium dot substitution ratio is a2·X2:a2, a straight line having a slope equivalent to the slope G2/(G2−G1) of the double lines multiplied by X2 is designated as the medium dot recording level. For the medium dot, a straight line of slope X2·G2/(G2−G1) is used for per-ink color tone values G1-G2, and a straight line of slope −X2·G2/(255−G2) is used for per-ink color tone values G1−255.

A mixture of small dots and large dots together may be recorded as well. There are various possible modes for peak height and recording range in the graphs for each dot type. Some or all of the graphs may be curving lines.

After completing Step S1120, a standard dot allocation table is created (Step S1125). Referring to FIG. 13 in the following description, in the standard large/medium/small allocation table TA1, in association with each tone value of tone values of 0-255 for each ink color, there are stored large/medium/small recording levels D1s(0)-D1s(255), D1m(0)-D1m(255), and D1l(0)-D1l(255). By so doing, for all 256 stages of tone values for each ink color 0-255, there are determined association relationships between tone value for each ink color and recording level for each dot type, these being stored on a per-dot type basis in table TA1. The created table TA1 represents data specifying association relationships of tone values of each ink color representing standard ink usage level, to ink drop recording level of standard ink at each tone. It also constitutes data imparting high quality to an image printed on the printing medium by means of standard ink.

Subsequently, a determination is made as to whether a standard large/medium/small allocation table has been created for all of the colors CMYRVK (Step S1130), and if the condition is not fulfilled, S1105-S1130 are repeated, whereas if the condition is fulfilled, the flow is terminated. The created standard large/medium/small allocation table is stored on the HD 14, as large/medium/small allocation table 14b, for example.

Next, referring to the flow in FIG. 18 and FIG. 19, the derived large/medium/small allocation table creation process carried out by the recording level specifying data creating device will be described. The computer 10 that performs this process and the standard large/medium/small allocation table creation process described above is composed of means that correspond to Steps S1-S4 shown in FIG. 11, and selects an index quantity in S1210-S1225. S1230-S1235 correspond to the process of carrying out printing control of a standard image; S1240-S1245 correspond to the process of acquiring color value data; and S1105-S1130, S1250-S1280 correspond to the process of creating recording level specifying data. While recording level specifying data is created in S1250-S1280, in detail, color deviation can be thought of as being acquired in S1250-S1270.

First, by updating a value of a pointer that stores a plurality of numerical values corresponding to the colors CMYRVK, a target color targeted for correction of the standard large/medium/small allocation table is established (S1205). Next, in the index quantity selection step S1, with an ink cartridge of standard ink installed in a standard printer serving as a standard (standard printing device), the computer 10 performs control such that, for each dot type, index quantity selection patches P1 at multiple stages of standard ink drop recording level are printed onto a predetermined printing medium (S1210). Standard recording level data 14e is stored on HD 14. This standard recording level data 14e is data for printing a plurality of solid index quantity selection patches at multi-stage standard ink drop recording levels (e.g. dot recording rate Ri, i being an integer from 1 to n, n=9, R1=10%, R2=20%, . . . , R9=90%); index quantity selection patches are printed using the standard recording level data. The standard recording level data is data giving tone representation of index quantity selection patches by ink color and by dot type, with a multitude of pixels in a dot matrix arrangement. A predetermined halftone process and a predetermined rasterizing process are performed on the standard recording level data to produce raster data, and by sending this raster data to the printer, a plurality of index quantity selection patches P1 are printed. These patches P1 are printed for each color and for each ink size (each type). Each patch P1 is a printed image composed of one-dimensional color using only one type of ink, so that the printed image is uniform solid color overall. Here, dot recording level can refers to dot recording number per unit of area on the printing medium, for example.

As the printing medium, from the standpoint of obtaining consistent color and performing color compensation with high accuracy, it is preferable to use photo paper or other glossy paper; however, from the standpoint of reducing the costs entailed in calibration, it is preferable to use plain paper having lower gloss than glossy paper. The same can be said to be true in the case of printing standard images described hereinbelow.

Using the colorimeter 40, the index quantity selection patches P1 that have been printed onto the printing medium are measured in the Lab color space (predetermined color space), and in the computer 10 the color value data, namely, color component levels L, a, b, for each of the printed index quantity selection patches P1 are acquired from the colorimeter 40 (S1215). At this time, the printing medium onto which index quantity selection patches P1 have been printed is itself measured in the Lab color space, and in the computer 10 the color value data for the printing medium is acquired from the colorimeter 40. For example, it is possible employ an arrangement wherein a button for confirming that color measurement operations have been completed for all patches is displayed on the display, and upon receiving a mouse operation of the button, there is sent to the colorimeter a signal to output color value data, and the color value data output from the calorimeter after sending is acquired. This applies hereinbelow as well.

Here, the color component levels L, a, b are L level a level, and b level that define the CIE (1976) Lab color space specified in JIS Z8105 as well. Of course, L level, a level, and b level may also be converted by a one-dimensional equation etc. into tone values all of given tone number (e.g. 256 tones). Each tone number is also a plurality of color component levels, and by making all of the plurality of color component levels of the color space tone values of given tone number, there is afforded more reliable color reproduction with respect to standard color for a target printer.

After completing S1215, for each dot type, of the color component levels L, a, b, and color difference WE of an index quantity selection patch printed using the standard ink in the Lab color space and the printing medium on which the patch is printed, the index quantity that undergoes monotonic change (monotonic increase or monotonic decrease) with respect to change in ink drop recording level is designated as the monotonic index quantity, and data 13c representing the monotonic index quantity is stored temporarily in RAM (S 1220). Here, where the color value data of the patch in the Lab color space is LP, aP, bP, and the color value data of the printing medium is LM, aM, bM, the color difference can be calculated by the computational equation:

$$WE = \{(LP-ML)^2 + (aP-aM)^2 + (bP-bM)^2\}^{1/2} \quad (1)$$

In this embodiment, in order to facilitate the calibration procedure, the color component levels L, a, b in the Lab color space are used as-is as part of the plurality of index quantities obtained from color value data, and in order to improve color reproduction by the printer targeted for calibration, the color difference WE is also used as part of the plurality of index quantities. Of course, a numerical quantity derived from a combination of two or more of the plurality of color component levels, such as $(a^2+b^2)^{1/2}$ or $(L^2+a^2+b^2)^{1/2}$, could also be used as an index quantity obtained from color value data.

Of course, the color difference WE, together with the L level, a level and b level, could be converted by a one-dimensional equation etc. into tone values all of predetermined given tone number (e.g. 256 tones). Each tone number is also a plurality of color component levels, and by making all of the plurality of index quantities tone values of given tone number, there is afforded more reliable color reproduction with respect to standard color for a target printer.

Next, on the basis of designated monotonic index quantity and ink drop recording levels at which the plurality of index quantity selection patches P1 were printed, the selected index quantity that among the monotonic index quantities has the greatest difference with respect to change in ink drop recording level is designated as the index quantity for creating the derived large/medium/small allocation table, and data 13d representing the designated selected index quantity is stored temporarily in RAM (S1225).

Figure 20:
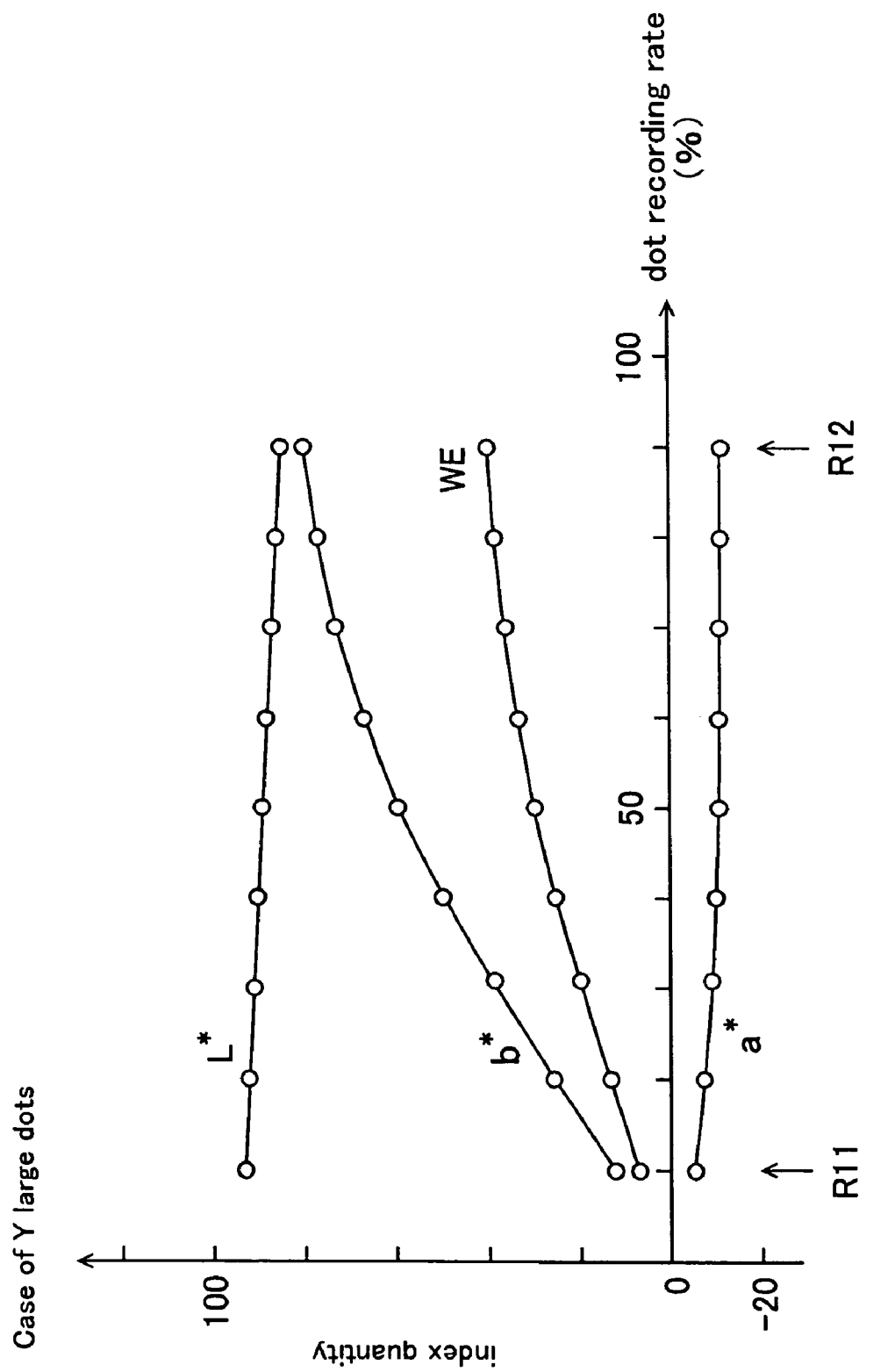
FIG. 20 is a diagram showing an example of index quantities L, a, b WE versus dot recording rate.

FIG. 20 shows, for Y large dots, an example of the result of color measurement in the Lab space of nine-step index quantity selection patches printed on glossy paper, at ratios of recorded dot count to total number of pixels in a predetermined area on the printing medium (i.e. dot recording rate which is the relative value of ink drop recording level) ranging from 10-90% at 10% intervals. Here, the horizontal axis gives dot recording rate (% unit) and the vertical axis gives L level, a level, b level and color difference WE defining the Lab color space. In the illustrated example, level b, which of L level a level, b level and color difference WE has the greatest difference with respect to change in ink drop recording level is taken as the selected index quantity, and specified as the index quantity for creating the derived large/medium/small allocation table.

For example, with regard to color and dot type specifying a monotonic index quantity, where a parameter j representing the type of index quantity is an integer from 1 to 4, index quantity when measuring color of an index quantity selection patch of dot recording rate Ri is denoted as Sj(i), and a parameter i representing each stage of dot recording rate is an integer from 1 to n−1, for all values of i, if the expression $$Sj(i+1) > Sj(i) \quad (2)$$

is true, the index quantity of parameter j is monotonic increase with respect to ink drop recording level. Also, when for all values of i the expression $$Sj(i+1) < Sj(i) \quad (3)$$

is true, the index quantity of parameter j is monotonic decrease with respect to ink drop recording level. Accordingly, it is acceptable to specify an index quantity that fulfils the aforementioned inequality (2) or (3) as the monotonic index quantity.

Also, with regard to color and dot type specifying a selected index quantity, minimum values of index quantities L, a, b, WE when measuring color of an index quantity selection patch of dot recording rate Ri are denoted respectively as L1, a1, b1 and WE1, and the maximum values respectively as L2, a2, b2 and WE2. The differences of index quantities of the patch can be calculated as $\Delta L = L2-L1$, $\Delta a = a2-a1$, $\Delta b = b2\cdot b1$, and $\Delta WE = WE2-WE1$, and the index quantity corresponding to the largest calculated value among $\Delta L$, $\Delta a$, $\Delta b$ and $\Delta WE$ designated as the selected index quantity.

Here, index quantity with the greatest difference with respect to change in ink drop recording level includes the index quantity with the greatest change with respect to change in ink drop recording level. For example, with regard to color and dot type specifying a selected index quantity, mutually different dot recording rates are denoted as R11 and R12; index quantities L, a, b, WE when measuring color of an index quantity selection patch of dot recording rate R11 are denoted respectively as L1, a1, b1 and WE1; and index quantities L, a, b, WE when measuring color of an index quantity selection patch of dot recording rate R12 (it is assumed that R12>R11) are denoted respectively as L2, a2, b2 and WE2. Where the differences in index quantities for the two index quantity selection patches of recording rates R11, R12 are calculated as $\Delta L = |L2-L1|$, $\Delta a = |a2-a1|$, $\Delta b = |b2-b1|$, $\Delta WE = |WE2-WE1|$, $\Delta L$, $\Delta a$, $\Delta b$ and $\Delta WE$ are values that become greater the greater the difference in index quantity for the two index quantity selection patches of recording rates R11, R12. Accordingly, the index quantity corresponding to the greatest calculated value among $\Delta L$, $\Delta a$, $\Delta b$ and $\Delta WE$ can be designated as the selected index quantity. Also, where the minimum dot recording rate and maximum dot recording rate among varying dot recording rates are denoted as R11, R12, good color reproduction of standard color for the target printer can be achieved.

Once a selected index quantity is specified, in the standard image printing control step S2, first, with an ink cartridge of standard ink installed in a standard printer, the computer 10 performs control such that, for each dot type, standard patches (standard images) P2 at multiple stages of standard ink drop recording level are printed onto a predetermined printing medium (S1230). Standard ink usage level data 14$f$ is stored on HD 14. This standard ink usage level data 14$f$ is data for printing a plurality of solid index quantity selection patches at tone values (for tone values of 0-255, RIi×255/100) for each ink color, representing multiple stages of ink usage level (e.g. dot recording rate RIi, i being an integer from 1 to n, n=9, RI1=10%, RI2=20%, . . . , RI9=90%); standard patches are printed using the standard ink usage level data. During this time, by referring to the standard large/medium/small allocation tables stored on the HD, for each pixel making up the image data, conversion from tone values for each color, represented by ink usage levels of standard ink, to recording levels representing recording level of N types of ink drop for each of these types is carried out to effect conversion to recording level data for each dot type. Next, a predetermined halftone process and a predetermined rasterizing process are performed on the recording level data to produce raster data, and by sending this raster data to the printer, a plurality of standard patches P2 are printed. Each patch P2 is a printed image composed of one-dimensional color using only one type of ink, so that the printed image is uniform solid color overall.

Next, with an ink cartridge of target ink installed in a standard printer, the computer 10 performs control such that, for each dot type, color compensation patches (standard images) P3 at multiple stages of standard ink drop recording level are printed onto a predetermined printing medium (S1235). This can be carried out in the same manner as in S1230 using standard ink usage level data 14$f$ stored on HD 14. That is, by referring to the standard large/medium/small allocation tables stored on the HD, for each pixel making up image data, conversion from tone values for each color, represented by ink usage levels of standard ink, to recording levels representing recording level of N types of ink drop for each of these types is carried out to effect conversion to recording level data for each dot type. Then, a predetermined halftone process and a predetermined rasterizing process are performed on the standard recording level data to produce raster data, and by sending this raster data to the printer, a plurality of color compensation patches P3 are printed. Patches P3 are also printed images composed of one-dimensional color using only one type of ink, so that the printed image is uniform solid color overall.

Once the aforementioned patches P2, P3 have been printed, in the color value data acquisition step S3, first, the colorimeter 40 is used to measure, in the Lab color space, the standard patches P2 printed using standard ink; then, in the computer 10, color value data is acquired for each patch P2, and in accordance with the data 13$d$ representing selected index quantity the selected index quantity selected in Step S1 is acquired on the basis of color value data (S1240). The color value data and selected index quantity obtained here are standard color data derived by color measurement, in a predetermined color space, of a standard image printed onto a printing medium at standard ink drop recording level using standard ink. In the event that the selected index quantity is color difference WE, color value data LM, aM, bM of the printing medium onto which the standard patches P2 are printed is acquired as well, and WE is calculated from the color value data LP, aP, bP of each standard patch itself, in accordance with Eq. (1) given previously.

The color compensation patches P3 printed using the target ink are also measured in the Lab color space using the calorimeter 40, and then in the computer 10, color value data is acquired for each patch P3, and in accordance with the data 13$d$ representing selected index quantity the selected index quantity selected in Step S1 is acquired on the basis of color value data (S1245). The color value data and selected index quantity obtained here are color data derived by color measurement, in a predetermined color space, of a standard image printed onto a printing medium at standard ink drop recording level using the target ink. In the event that the selected index quantity is color difference WE, color value data LM, aM, bM of the printing medium onto which the standard patches P2 are printed is acquired as well, and WE is calculated from the color value data LP, aP, bP of each standard patch itself, in accordance with Eq. (1) given previously.

By means of the preceding, selected index quantities (color value data) can be obtained when measuring color of standard images printed onto a printing medium.

Once selected index quantities of the aforementioned patches P2, P3 have been acquired, in the recording level specifying data creation step S4, tone values for each ink color represented by ink usage level of target ink and tone values for each ink color represented by ink usage level of standard ink are associated with one another on the basis of the selected index quantities, and association relationship data that associates tone values of each ink color of the two inks for a given selected index quantity is created (S1250). Here, association of tone values of each ink color of the two inks is comparison of standard color value data of the standard patch and color value data of a color compensation patch, the association relationship data produced thereby being the result of the comparison.

Figure 21:
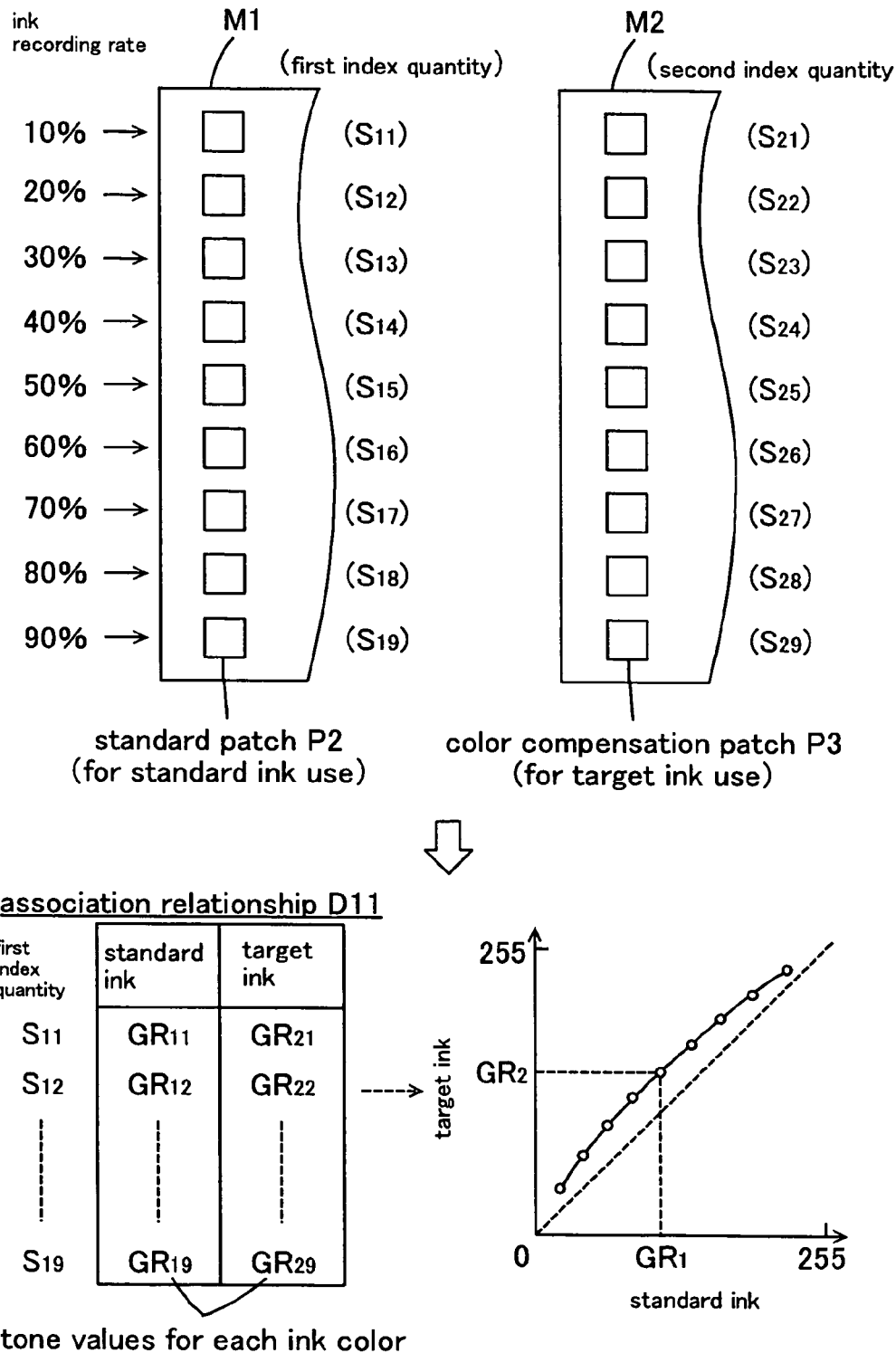
FIG. 21 is a diagram showing a model depiction of generation of association relationship data.

FIG. 21 is a diagram depicting generation of the aforementioned association relationship data. At top in the drawing there is depicted printing of nine-step standard patches P2 at ink recording rates ranging from 10-90% at 10% intervals, corresponding to the dot recording rate for the large dots, onto a printing medium M1 of predetermined type (e.g. glossy paper etc.) with large dots of standard ink; and printing of color compensation patches P3 at ink recording rates ranging from 10-90% at 10% intervals, with large dots of a target ink. Here, selected index quantities for the standard patches P2 first index quantities) are denoted as $S_{11}$-$S_{19}$, and selected index quantities for the color compensation patches P3 (second index quantities) are denoted as $S_{21}$-$S_{29}$. Tone values $GR_{11}$-$GR_{19}$ of each ink color of standard ink constituting the first index quantities $S_{11}$-$S_{19}$ are values derived by multiplying standard ink recording rates of 0.1-0.9 (10-90%) by the maximum tone value 255. Tone values $GR_{21}$-$GR_{29}$ of each ink color of target ink constituting the first index quantities $S_{11}$-$S_{19}$ are values derived by multiplying target ink recording rates of 0.1-0.9 by the maximum tone value 255. Tone values $GR'_{21}$-$GR'_{29}$ of each ink color of target ink constituting the first index quantities $S_{11}$-$S_{19}$, can be calculated values derived on the basis of the association relationship with the tone values $GR_{21}$-$GR_{29}$ of each ink color of target ink constituting the second index quantities $S_{21}$-$S_{29}$, by spline interpolation (linear interpolation is also possible) or the like to derive a curving line or other such approximate equation GR=f(S) for calculating tone value GR for each ink color of target ink from index quantity S, and then substituting the first index quantities $S_{11}$-$S_{19}$ into this approximate equation. Where a curving line approximate equation is derived by spline interpolation or the like, since the association relationship between index quantity S and tone value GR for each ink color can be approximated smoothly, the association relationship can be specified more accurately, and it becomes possible to obtain more accurately printed images with reduced color deviation due to differences in ink.

Tone values for each ink color of the two inks with the same first index quantities $S_{11}$-$S_{19}$, i.e. $GR_{11}$ and $GR'_{21}, \ldots, GR_{19}$ and $GR'_{29}$ are associated with one another to create association relationship data D11. This association relationship data is an information table specifying, on the basis of color value data, association relationships for tone values for each ink color of standard ink and tone values for each ink color of target ink.

When the association relationship data is generated, by referring to the standard large/medium/small allocation table TA1, for the target color, tone values $GR_{1k}$ (k is an integer from 1 to Nk, in this example, Nk=9) for each ink color representing ink usage level of standard ink of each standard patch P2 are converted to recording level data representing ink drop recording level of each dot type (S1255). Here, ink drop recording levels for small dots, medium dots, and large dots are denoted respectively as S1k, M1k, L1k. Also, by referring to the standard large/medium/small allocation table TA1, for the target color, tone values $GR'_{2k}$ for each ink color representing ink usage level of the target ink of each color compensation patch P3 are converted to recording level data representing ink drop recording level of each dot type (S1260). Here, ink drop recording levels for small dots, medium dots, and large dots are denoted respectively as S2k, M2k, L2k. Next, for the target color, ratios of ink drop recording levels RSk=S2k/S1k, RMk=M2k/M1k, RLk=L2k/L1k, are calculated for each dot type.

Figure 22:
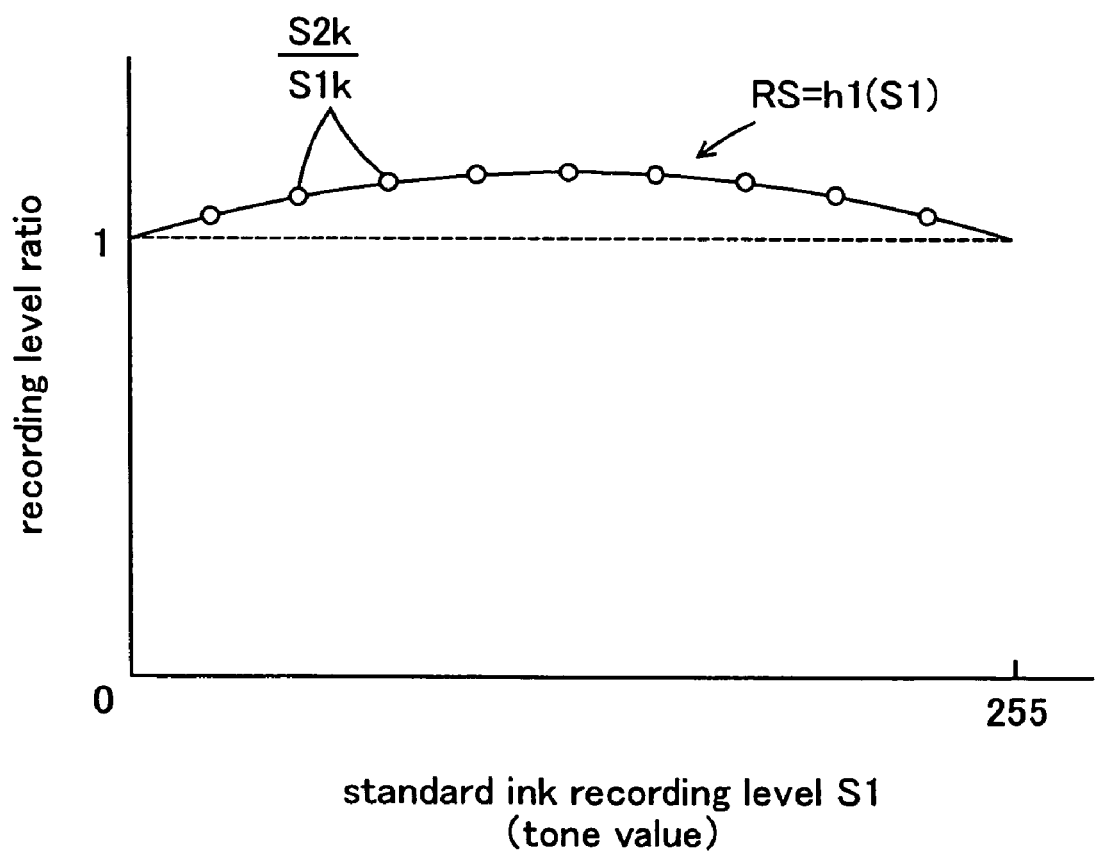
FIG. 22 is a diagram of an approximate expression of the ratio of ink drop recording level to ink drop recording level of standard ink.

Additionally, as shown in FIG. 22, on the basis of association relationships of the ink drop recording levels RSk, RMk, RLk with respect to ink drop recording levels of standard ink S1k, M1k, L1k, for each dot type, a curving line or other such approximate equation RS=h1(S1), RM=h2(M1), RL=h3(L1) for calculating ink drop recording level ratio RM, RM, RL from ink drop recording levels of standard ink S1, M1, L1 is derived by means of carrying out spline interpolation (linear interpolation is also possible) or other interpolation calculation; and for the target color, the ratio RS, RM, RL for all tone values of ink drop recording level is calculated for each dot type (S1270). Where a curving line approximate equation is derived by spline interpolation or the like, since the association relationship between ink drop recording levels of standard ink S1k, M1k, L1k and ink drop recording level ratio RM, RM, RL can be approximated smoothly, the association relationship can be specified more accurately, and it becomes possible to obtain more accurately printed images with reduced color deviation due to differences in ink.

Subsequently, the standard large/medium/small allocation table TA1 is read out (copied) to RAM, and the standard large/medium/small allocation table is corrected by means of multiplying ratios RS, RM, RL by the ink drop recording levels of the table TA (S1275). Referring to FIG. 13 in the following description, tone values g1 of each ink color targeted for correction are sequentially established from among all tones of the tone values 0-255 for each ink color of the standard large/medium/small allocation table TA1, and ratios RS, RM, RL are multiplied respectively by the small dot, medium dot, and large dot recording levels D1s (g1), D1m (g1), D1l (g1) corresponding to tone value g1 for each ink color, to give corrected recording levels D2s (g1)=D1s (g1)× RS, D2m (g1)=D1m (g1)×RM, D2l (g1)=D1l (g1)×RL.

Once recording level has been corrected for all tones of tone values of each ink color, these are stored as a derived large/medium/small allocation table TA2 in HD 14 (S1280). The created table TA2 is data specifying association relationships for tone values of each ink color representing standard ink usage level, and ink drop recording levels of target ink in each tone. Here, since the derived large/medium/small allocation table is created on the basis of association relationship data that associates tone values of each ink color of standard ink with values of each ink color of target ink on the basis of color value data for both patches, the derived large/medium/small allocation table is data that specifies an association relationship that compensates for (minimizes) differences of color compensation patch color value data with respect to standard patch standard color value data. In other words, the derived large/medium/small allocation table is data that specifies an association relationship of tone values for each ink color and recording levels such that compensates, for each of the N types of ink drops, color deviation of the ink drop recording level color compensation patches P3 printed onto the printing medium at standard ink drop recording level when the target ink is used, with respect to the drop recording level standard patches P2 printed onto the printing medium at the same type of standard ink drop recording level when the standard ink is used.

A determination is then made as to whether derived large/medium/small allocation tables have been created for all of the colors CMYRVK (S1285), and if the condition is not fulfilled, S1205-S1285 are repeated, whereas if the condition is fulfilled, the flow is terminated. By carrying out a similar process for a different target ink, the derived large/medium/small allocation table shown in FIG. 13 can be created.

Where printing control of the printer is carried out using derived large/medium/small allocation tables created in the preceding manner, using the standard ink color conversion LUT, RGB data is subjected to color conversion to CMYRVK data, and then making reference to the derived large/medium/small allocation tables, the CMYRVK data can be converted to recording level data for each color and each dot type. Here, the recording level data is data that compensates, for each dot type, for color deviation in an image printed on a printing medium using target ink. Where control of the printer is carried out to form large/medium/small dots of each color corresponding to the recording level data, there can be printed a printed image having compensated color deviation with respect to standard ink. Accordingly, the need to recreate the color conversion LUT is obviated even when the ink set used by the printer is modified, so that the calibration procedure of the target printer can be made faster.

Figure 23:
FIG. 23 is an illustration comparing the amount of data required with that in the prior art.

Also, as shown in FIG. 23, in a color conversion LUT having $17^3$ reference points, the amount of data is about 29 KB ($17^3$ points×6 colors), and the amount of data in a large/medium/small allocation table storing large/medium/small dot recording levels for all 256 tones is about 5 KB (256×3 types×6 colors). Thus, where three types of ink set are used interchangeably, in the past, a memory area of approximately 102 KB (29×3+5×3) was needed to store the color conversion LUTs and large/medium/small allocation tables, whereas according to the present invention, a memory area of approximately 44 KB (29+5×3) will suffice. In this way, the need to store in memory a plurality of color conversion LUTs is obviated even in cases where several types of ink set are used interchangeably, and thus the amount of data needing to be stored can be reduced.

Additionally, since association relationships of derived large/medium/small allocation tables are specified from objectively evaluatable color value data, derived large/medium/small allocation tables are data that can minimize differences in color between the standard ink and the target ink with a greater degree of accuracy. Accordingly, it is possible with a greater degree of accuracy to obtain printed images with less color deviation due to differences in ink.

Further, association relationships defined by derived large/medium/small allocation tables are specified in such a way as to minimize differences between monotonic index quantity of a standard patch based exclusively on a monotonic index quantity that, of the plurality of index quantities derived from color value data, undergoes monotonic change, and monotonic index quantity of a color compensation patch, affording good color reproduction by the target printer. Here, for the standard patch and the color compensation patch, the respective color components of the color space serving as the basis for color measurement, and color difference with respect to the printing medium, are within the selection range of monotonic index quantities used in creating the derived large/medium/small allocation tables, whereby good color reproduction by the target printer can be maintained, and the calibration procedure of the target printer can be made faster.

Additionally, since association relationships defined by derived large/medium/small allocation tables are specified such that color deviation is minimized exclusively on the basis of the index quantity with the greatest change relative to change in ink drop recording level of standard ink, the calibration procedure of the target printer can be made faster.

Also, since large/medium/small allocation tables are created using a standard printer and uses in a printer that uses a target ink (target printing device), minimal labor is entailed in creating large/medium/small allocation tables. Of course, large/medium/small allocation tables could also be created using the target printer actually targeted for printing control, although advantages such as these would be lost. In this case, there can be created large/medium/small allocation tables that minimize color deviation of images due to differences among printers.

Figure 24:
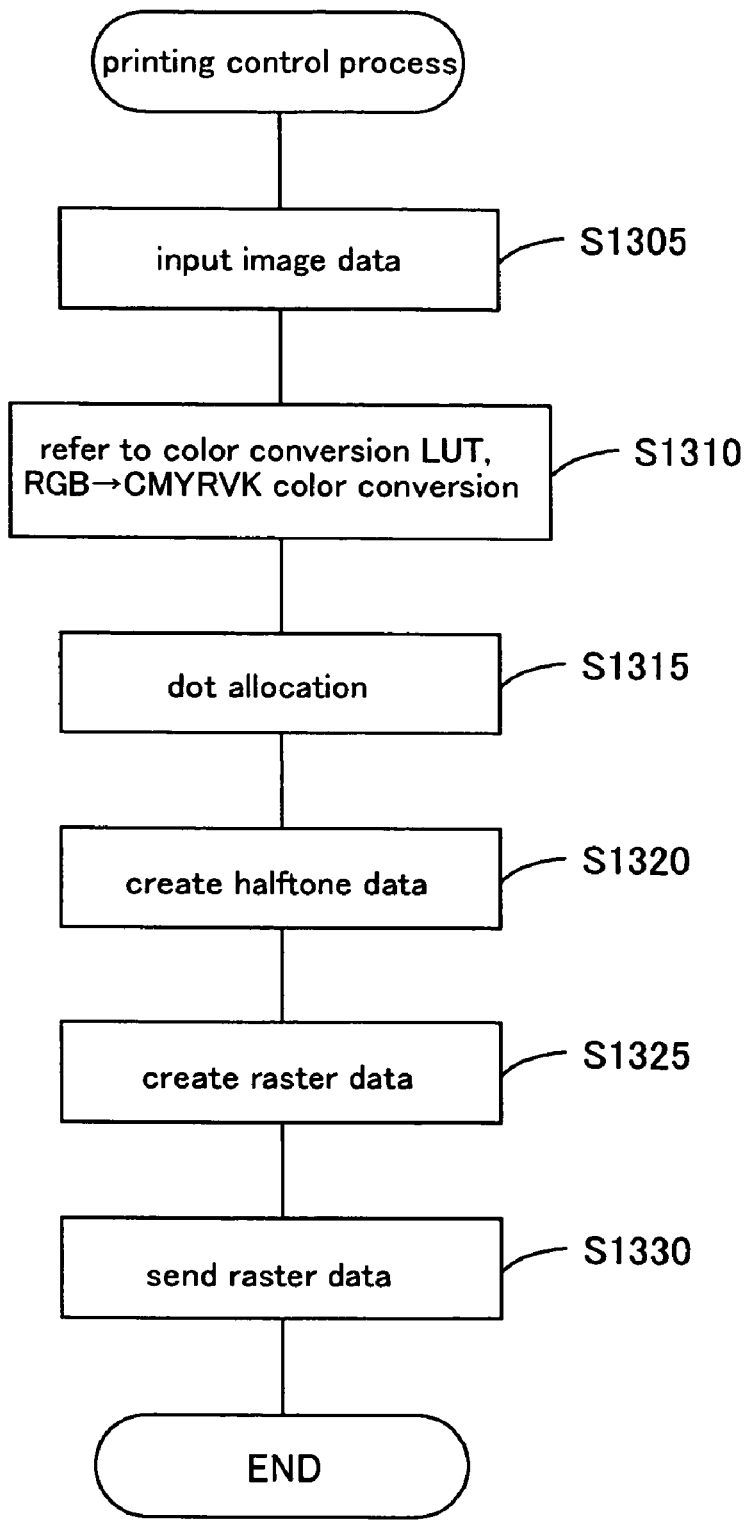
FIG. 24 is a flowchart showing the printing control process performed by the printing control device.

(6) Printing Control Process Using Recording Level Specifying Data:

FIG. 24 is a flowchart showing the printing control process performed on the printer using the large/medium/small allocation tables crated by the large/medium/small allocation table creation process described previously. The computer 10 which carries out the process constitutes the printing control device, with S1310 corresponding to the color conversion process, S1315 corresponding to the dot allocation process, and S1320-S1330 corresponding to the printing control process. The description hereinbelow makes reference to FIG. 9 also.

First, the computer 10 inputs image data DA1 specifying tone values of a plurality of elemental colors for each of a multitude (predetermined number) of pixels, and converts the image into RGB data DA2 in the wide gamut RGB color space providing tone representation of an image by a plurality of pixels for each [color] RGB (S1305). At this time, the data may be read partially, or a pointer representing a buffer area used for data transfer simply transferred. Image data DA1 is data providing tone representation of an image in terms of color for each of a multitude of pixels in a dot matrix arrangement, and could be image data composed of RGB defined in the sRGB color space, image data composed of YUV in the YUV color system, or the like. Since the components of the image data have various tone numbers, the image data is converted into 256-tone RGB data in the wide gamut RGB color space, in accordance with the definitions of sRGB or the YUV color system. The RGB is print data representing an image with a plurality of elemental colors RGB.

Next, while taking the tone value of each pixel making up the RGB data as conversion targets and sequentially moving target pixels, reference is made to the color conversion LUT 14a, to convert the RGB data (first image data) DA2 representing the image by tone value of each RGB (first elemental colors) for each pixel, into CMYRVK data (tone value for each ink color) DA3 represented by tone values for each CMYRVK corresponding to the color of inks used by the printer (S1310). The color conversion LUT 14a is an information table specifying, for a plurality of reference points, association relationships between tone values of each RGB, and tone values representing for each CMYRVK the usage level of standard ink used by the printer. In the event that the color conversion LUT does not have stored therein CMYRVK data matching tone values for each RGB of the input RGB data, tone values for each CMYRVK of CMYRVK data corresponding to a plurality of tone values for each RGB close to the tone values for each RGB in question are acquired, and by means of volume interpolation or other interpolation calculation, are converted to tone values for each CMYRVK corresponding to tone values for each RGB that was input. Like the RGB data DA2, the CMYRVK data DA3 is print data providing tone representation of an image in terms of color for each of a multitude (predetermined number) of pixels in a dot matrix arrangement; tone values for each pixel are CMYRVK 256-tone data representing usage level of inks ejected from the print heads in the printer 20.

Subsequently, while taking the tone value of each pixel making up the CMYRVK data DA3 as conversion targets and sequentially moving target pixels, by making reference to the large/medium/small allocation table for the target ink (any of 14b-d), there is carried out a dot allocation process (S1315) for converting tone values on a CMYRVK per-color basis making up the CMYRVK data (tone values for each ink color) into recording level data DA4 representing, on a per-type basis, recording levels of N types of ink drops with different ink levels. For each color, recording level data is composed of small dot recording level data, medium dot recording level data, and large dot recording level data. Like the CMYRVK data, this recording level data is data providing tone representation of an image in terms of color for each of a multitude (predetermined number) of pixels in a dot matrix arrangement; values for each pixel are CMYRVK 256-tone data representing usage level of dots ejected from the print heads in the printer.

In the event that the standard ink and the target ink differ, the large/medium/small allocation tables 14c, d (same as derived large/medium/small allocation tables TA2, TA3) are used. These tables specify association relationships that, for each of N types of ink drops, compensate for (minimize) color deviation between an image printed onto the printing medium at the standard ink drop recording level when using standard ink, and an image printed onto the printing medium at the standard ink drop recording level when using target ink. Where the target ink is the standard ink, the large/medium/small allocation table 14b (same as the standard large/medium/small allocation table TA1) is used.

Once recording level data DA4 has been created, for each pixel making up the recording level data DA4, which is composed of recording levels after conversion by the dot allocating portion, the recording level data for each dot size is subjected to a predetermined halftone process such as an error diffusion process, a dither process, or a density pattern process, to create halftone data DA5 on a per-CMYRVK basis, having the same pixel count as the pixel count of the CMYRVK data DA3 (S1320). The halftone data is data representing dot recording status in terms of the dot on-off state;

for example, it could be binary data for two tone values, binarized so that a tone value of "1" corresponds to the dot on state, and a tone value of "0" corresponds to the dot off state. Of course, four-tone data or the like would be acceptable as well.

The created halftone data DA5 is then subjected to a predetermined rasterizing process and sorted in the order in which it will be used by the printer, to create raster data DA6 on per-CMYRVK basis (S1325), which is then output to the printer 20 (S1330), whereupon the flow terminates. Thereupon, the printer 20 acquires raster data representing the image, and on the basis of the data drives the print heads to eject ink onto the printer paper, forming a printed image 11 that corresponds to the RGB data DA2. The raster data is data that compensates for (minimizes) color deviation between an image printed with standard ink for each CMYRVK and each dot type, and an image printed with target ink, so that the image printed with target ink will have compensated color deviation with respect to the image printed with standard ink.

By means of the aforementioned S1320-S1330, the target printer, for each pixel making up the recording level data DA4, can be controlled to record onto the printing medium N types of ink drops of target ink corresponding to recording level of each pixel in the recording level data DA4. Where the printer is capable of executing halftone processing, multitone recording level data can be sent to the printer, and printing executed on the basis of the recording level data.

As described hereinabove, by using tone values of pixels of CMYRVK data DA3 (tone values for each ink color during the dot allocation process) as data representing usage level of standard ink, and using the associated recording level as data compensating for differences in color between standard ink and target ink, the need to recreate the color conversion LUT is obviated even where the ink combination used by the printer is modified, thus making it possible to speed up the calibration procedure of the target printer. Also, it becomes unnecessary to store a plurality of color conversion LUTs even in instances where a plurality of ink combinations are exchanged, reducing the amount of data that must be stored in memory.

Additionally, since association relationships of derived large/medium/small allocation tables are specified from objectively evaluatable color value data, it is possible to accurately obtain printed images with less color deviation due to differences in ink.

Further, association relationships defined by derived large/medium/small allocation tables are specified in such a way as to minimize differences between monotonic index quantity of a standard patch based exclusively on a monotonic index quantity that undergoes monotonic change, and monotonic index quantity of a color compensation patch, affording good color reproduction by the target printer.

(7) Variation Example of Embodiment 2

Various arrangements are possible for the computer and peripheral devices useable when reducing the invention to practice. For example, the printing device may be unitary with the computer. A printing device that prints monochromatic images only is acceptable. Some or all of the flows described hereinabove may be executed by the printing device or by a dedicated image processing device. Instead of the color conversion LUT described above, there could be used a conversion equation for color conversion, the equation specifying an association relationship among tone values for each first elemental color and tone values representing for each ink color the usage level of standard ink used by a printing device; and a plurality of parameters used in the conversion equation could be recorded in the form of a color conversion parameter table on the HD etc.

Besides printing control devices that convert from tone values for each color representing ink usage level to recording levels corresponding to all three types of dots that a printing device is able to record, the present invention is applicable also to devices that convert to recording levels corresponding to only some types of dots that a printing device is able to record (e.g. small and large dots). In the case of conversion to recording levels corresponding to small and large dots only, the printing device will be device capable of recording two or more dots with different ink levels, and dot allocation will be a process of conversion from tone levels for each ink color to recording levels of small and large dots (N types of ink drops). The aforementioned allocation can be an information table storing recording levels corresponding to small and large dots only.

Rather than the aforementioned large/medium/small allocation tables, there could instead be used a conversion equation for conversion to tone values of each ink color representing ink usage levels used in a printing device and recording levels representing recording levels of N types of ink drops, for each type; and a plurality of parameters used in the conversion equation could be recorded in the form of a dot allocation parameter table on the HD etc.

It sometimes occurs that, because of variations in drive voltage applied to print heads or variations in nozzle shapes among printing devices, ink levels of dots will differ among printing devices. In instances where large/medium/small allocation tables are created using a standard printing device, IDs representing, for each target printing device used by a user, dot ink level error (error information) of a target printing device with respect to dot ink levels of a standard printing device, are stored on a per-color and per-dot type basis in memory in the printing device; and when carrying out printing control the large/medium/small allocation table corresponding to the type of ink set is referred to in converting the color-converted CMYRVK data to recording level data for each dot type, as well as correcting the recording level data using the relevant ID, in order to compensate for color deviation due to differences among inks, and to compensate for dot ink level error among printing devices. By so doing, color reproduction by target printing devices can be improved, and picture quality of printed images can be made even better.

Also, where large/medium/small allocation tables are created for each target printing device as described above, a resultant advantage is that color deviation of a printed image due to dot ink level error among printing devices can be compensated for together with color deviation due to differences in inks, without having to use the aforementioned ID.

Figure 25:
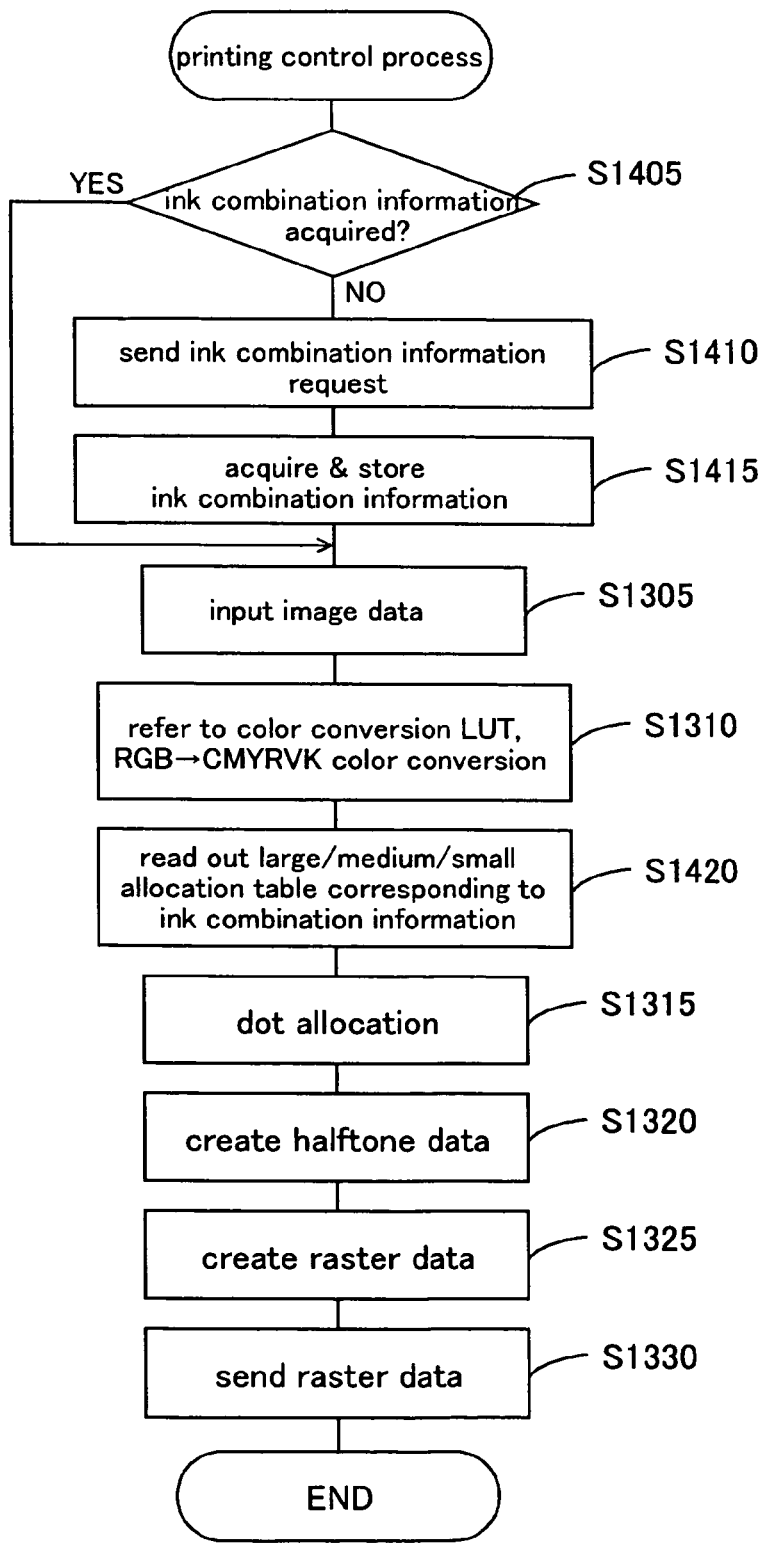
FIG. 25 is a flowchart showing the printing control process in a Variation Example

As shown in FIG. 25, ink combination type information representing the type of ink combination may be acquired from the printing device, and referred to switching from recording level specifying data. The flow in the drawing presumes that ink combination information is recorded in memory 31 (a memory chip 28a etc. is also acceptable) of the printer 20. Here, ink combination information is information for different types of ink sets, for example, assigning a "1" to a standard ink combination, a "2" to target ink combination 1, and a "3" to target ink combination 2, etc. As compared to the flow in FIG. 24, the flow in the drawing has additional steps S1405-S1415 and S1420.

When the process commences, the computer 10 makes a determination as to whether ink combination information has been acquired from the printer 20 (S1405). If the condition is met, it is determined that there is no need to acquire ink combination information from the printer, and the process advances to S1305. In the event that the printer connected to the computer 10 has been changed, it is determined that there is no ink combination information corresponding to the printer, and the process advances to S1410.

If the condition is not met, a request to obtain ink combination information is created and sent to the printer (S1410). Thereupon, the printer 20 receives the request, reads the ink combination information from memory 31, and sends it to the computer. At this point, the computer acquired the ink combination information, stores it on the HD 14 (S1415), and proceeds to S1305. In this way, since the ink combination information is integral with the printer, there is no need to separately input ink combination information even if the user of the printing system exchanges the ink set or changes the printer. Accordingly, the printing control device is convenient.

Subsequently, image data is input, and referring to the common standard ink color conversion LUT 14a, RGB data is converted to CMYRVK data (S1305-S1310). Next, the ink combination information stored on the HD is read out, and from among the large/medium/small allocation tables stored on the HD, the large/medium/small allocation table corresponding to the ink combination information in question is read into RAM (S1420). Then, referring to the read out large/medium/small allocation table, the CMYRVK data is converted to recording level data, and the printer 20 is controlled to record dots corresponding to the converted recording level data (S1315-S1330), whereupon the flow terminates.

By means of this process, even in cases where a plurality of ink sets are exchanged, a common color conversion LUT can be utilized simply by to switching to refer to a large/medium/small allocation table, so that the amount of data to be recorded can be minimized.

Of course, when using without exchange a target ink combination different from the standard ink combination, an arrangement whereby only a derived large/medium/small allocation table corresponding to the target ink combination is stored on the HD, and printing control carried out with reference to this table, would be acceptable.

Figure 14:
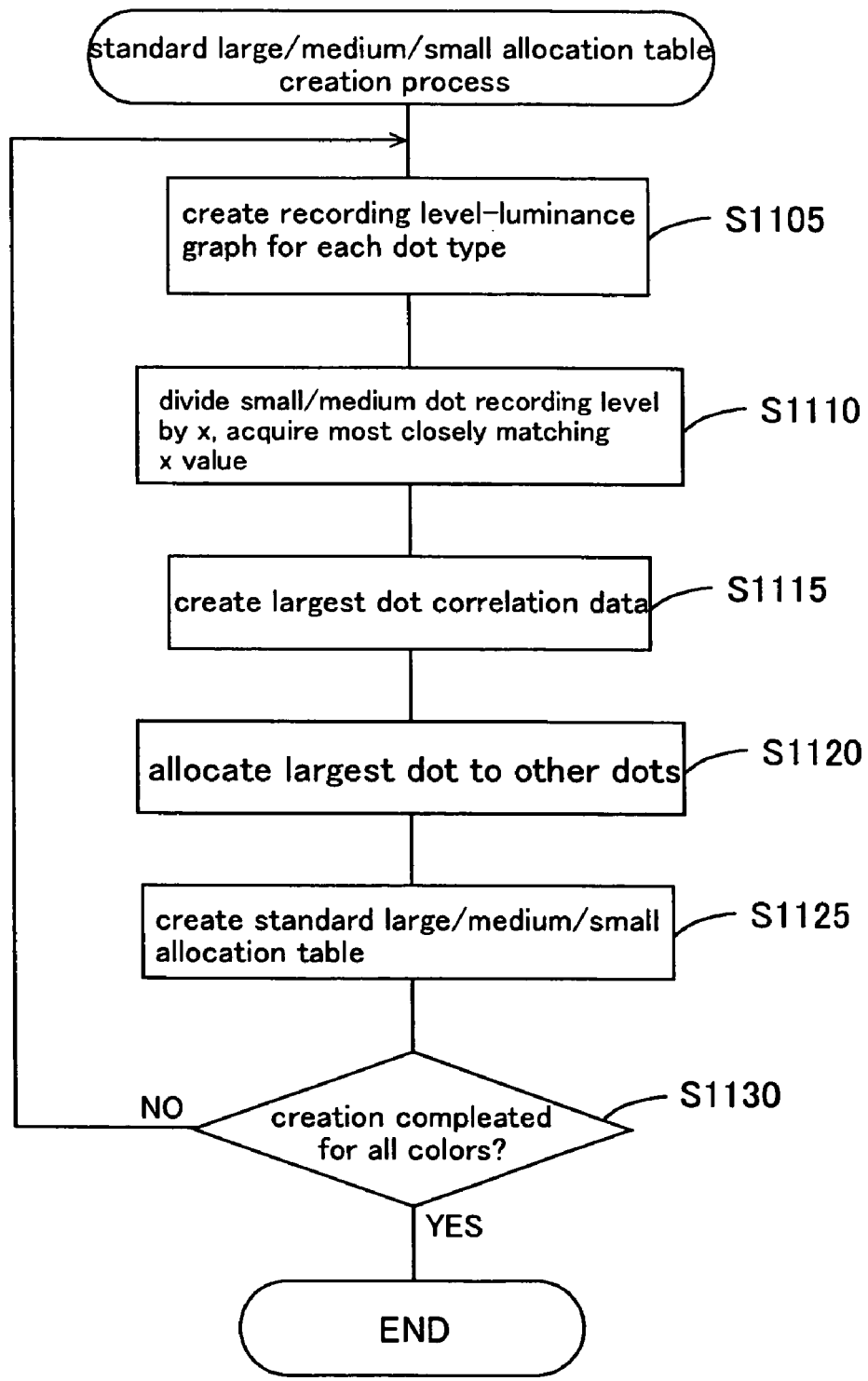
FIG. 14 is a flow chart showing a standard large/medium/small allocation table creation process.
Figure 18:
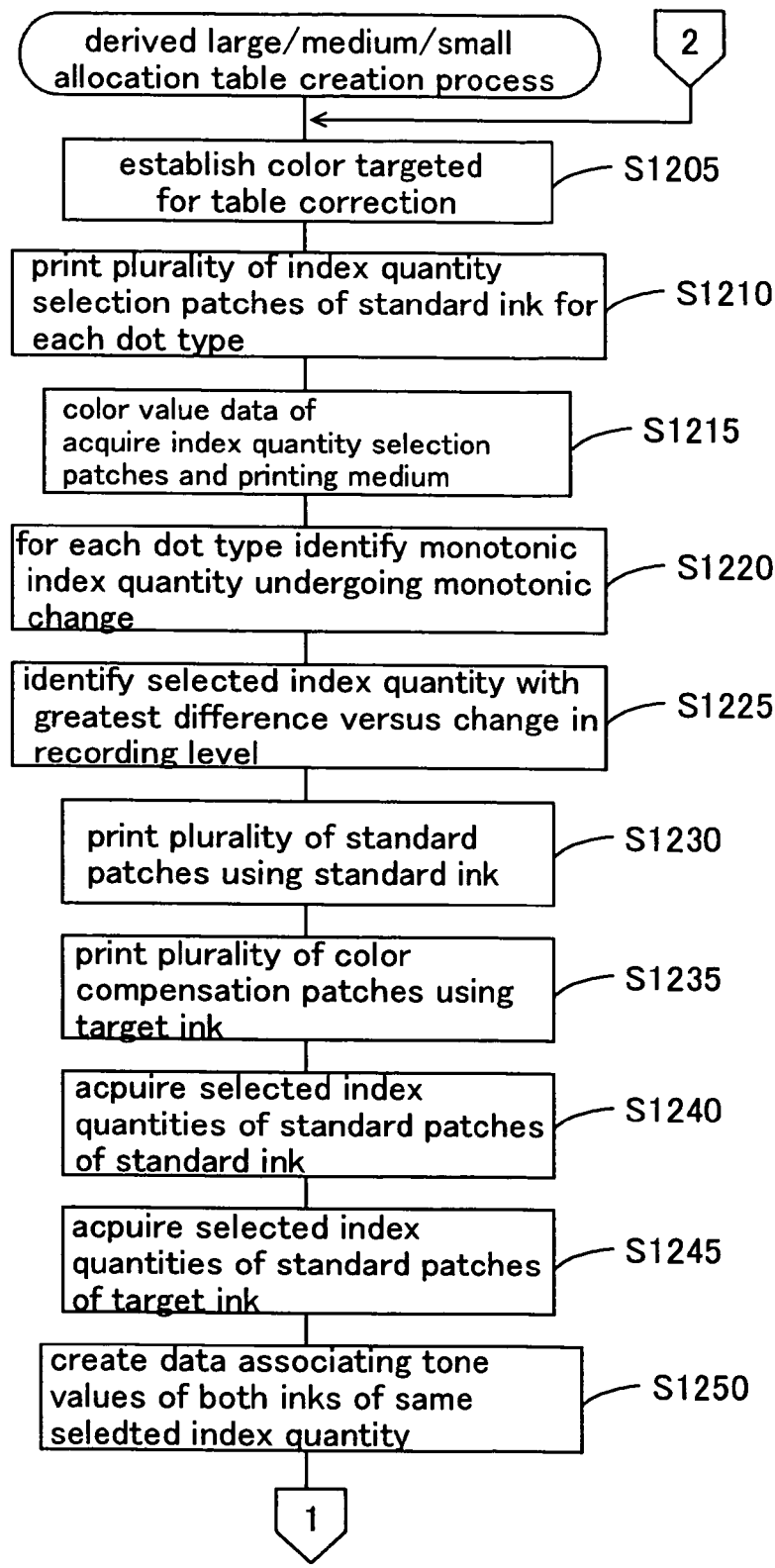
FIG. 18 is a flow chart of a derived large/medium/small allocation table creation process.
Figure 19:
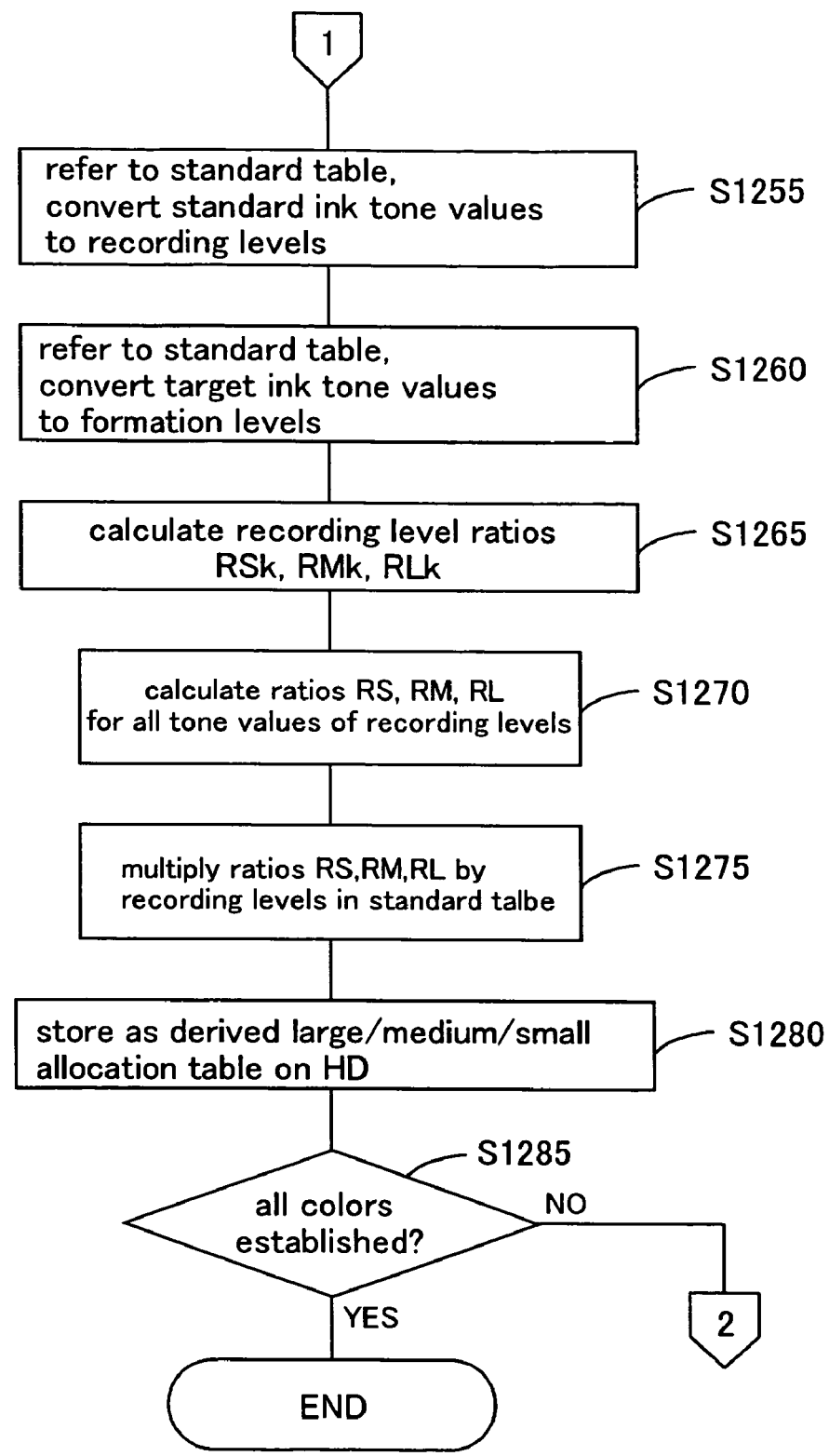
FIG. 19 is a flow chart of a derived large/medium/small allocation table creation process.
Figure 26:
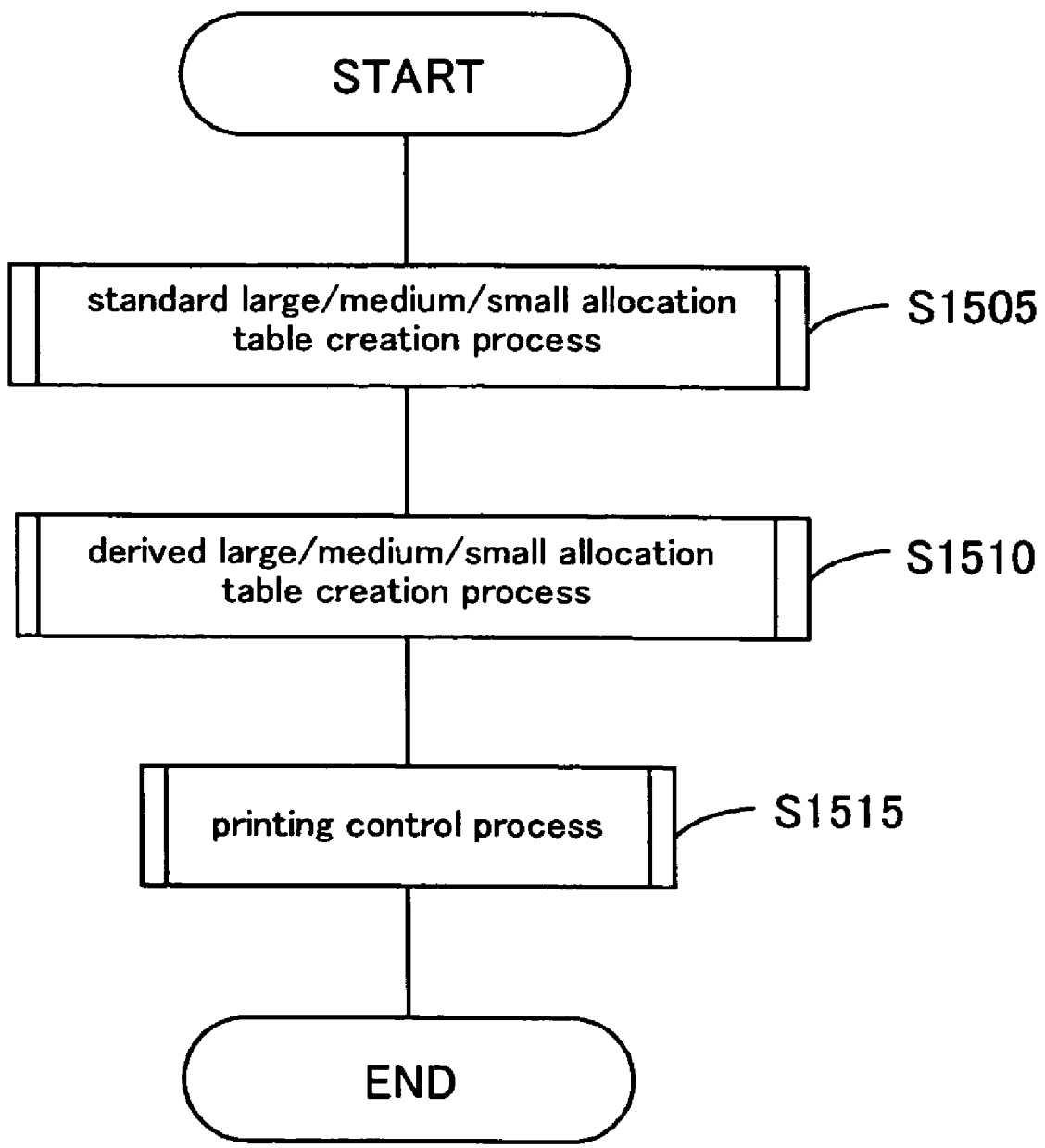
FIG. 26 is a flowchart showing a process performed by the printing control device in a Variation Example.

Also, as shown in FIG. 26, an arrangement whereby, using the target printer, the standard large/medium/small allocation table creation process shown in FIG. 14 is performed (S1505), the derived large/medium/small allocation table creation process shown in FIG. 18 and FIG. 19 is carried out (S1510), and then the printing control process shown in FIG. 24 or FIG. 25 is carried out (S1515) would also be acceptable.

With the above arrangement as well, it becomes unnecessary to recreate the color conversion LUT in instances where the ink set used by the printing device is changed, making it possible to speed up the calibration procedure of the target printer. Also, it becomes unnecessary to record a plurality of color conversion LUTs even in instances where a plurality of ink sets are used alternately, making it possible to reduce the amount of data that must be stored.

What is claimed is:

1. Printing control method for controlling a printing device that records ink drops of N types (N is an integer of 2 or greater) of different ink levels onto a printing medium under a plurality of printing conditions;

wherein there is recorded onto a predetermined recording medium standard color conversion table data associating tone values of each of the plurality of color components in a predetermined color system with tone values of each of said ink colors, said table data being shared under said plurality of printing conditions; and plurality of sets of recording level specifying data indicating association relationships between tone values of each of said ink colors and recording levels which correspond to a plurality of different ink drop sizes of said N types of ink drops, said data having said recording level determined for each of said plurality of printing conditions in such a way that output color of each tone value is generally common under said plurality of printing conditions;

the method comprising:
creating recording level specifying data, the creating of the recording level specifying data including
acquiring standard color value data indicating an association relationship between tone values when representing color of pixels forming an image with tones for each ink color used by the printing device, and color values when printing is carried out with the same tone values under a standard printing condition;
printing a plurality of patches under a predetermined printing condition, by means of a plurality of target recording levels indicating recording levels which correspond to a plurality of different ink drop sizes of said N types of ink drops;
acquiring color value data indicating color values of printed patches; and
referring to the acquired color value data and said standard color value data, associating ink drop recording levels and target tone values such that the association relationship of tone values derived by carrying out printing under said predetermined printing condition at recording levels which correspond to a plurality of different ink drop sizes of said N types of ink drops to a plurality of target tone values is substantially equal to the association relationship of color values specified by said standard color value data to tone values;
wherein said standard color value data has been preadjusted so that color values derived when patches are printed, under a standard printing condition, at recording levels derived by conversion of said input tone values by means of said standard color conversion table data and said standard recording level specifying data coincide with color values corresponding to said input tone values;
wherein said recording level specifying data is created individually for each said ink color;
wherein under each of said plurality of printing conditions, printing device resolution may differ; and
wherein under each of said plurality of printing conditions, the type of ink used by the printing device may differ;
acquiring image data in which colors of pixels forming an image are represented by tone values of a plurality of color components in said predetermined color system;
referring to said standard color conversion table to convert tone values of said image data into tone values for each ink color;
selecting, from among said plurality of sets of recording level specifying data, recording level specifying data that matches the printing condition at the time printing is executed, and converting color-converted tone values to recording levels which correspond to a plurality of different ink drop sizes of said N types of ink drops; and
carrying out printing of the converted recording levels which correspond to a plurality of different ink drop sizes.

2. Printing control device for controlling a printing device that records ink drops of N types (N is an integer of 2 or greater) of different ink levels onto a printing medium under a plurality of printing conditions, the printing control device comprising:

a standard color conversion table data recording medium that records standard color conversion table data associating tone values of each of the plurality of color components in a predetermined color system with tone values of each of said ink colors, said table data being shared under said plurality of printing conditions;

a recording level specifying data recording medium that records a plurality of recording level specifying data indicating association relationships between tone values of each of said ink colors and recording levels which correspond to a plurality of different ink drop sizes of said N types of ink drops, said data having said recording level determined for each of said plurality of printing conditions in such a way that output color of each tone value is generally common under said plurality of printing conditions;

a recording level specifying data creator, the recording level specifying data creator including a standard color value data acquiring portion for indicating an association relationship between tone values when representing color of pixels forming an image with tones for each ink color used by the printing device, and color values when printing is carried out with the same tone values under a standard printing condition;

a printing portion for printing a plurality of patches under a predetermined printing condition, by means of a plurality of target recording levels indicating recording levels which correspond to a plurality of different ink drop sizes of said N types of ink drops;

a color value data acquiring portion indicating color values of printed patches; and a tone value associating portion for referring to the acquired color value data and said standard color value data, associating ink drop recording levels and target tone values such that the association relationship of tone values derived by carrying out printing under said predetermined printing condition at recording levels which correspond to a plurality of different ink drop sizes of said N types of ink drops to a plurality of target tone values is substantially equal to the association relationship of color values specified by said standard color value data to tone values;

wherein said standard color value data has been preadjusted so that color values derived when patches are printed, under a standard printing condition, at recording levels derived by conversion of said input tone values by means of said standard color conversion table data and said standard recording level specifying data coincide with color values corresponding to said input tone values;

wherein said recording level specifying data is created individually for each said ink color;

wherein under each of said plurality of printing conditions, printing device resolution may differ; and wherein under each of said plurality of printing conditions, the type of ink used by the printing device may differ;

an image data acquiring portion for acquiring image data in which colors of pixels forming an image are represented by tone values of a plurality of color components in said predetermined color system;

a color conversion portion that refers to said standard color conversion table to convert tone values of said image data into tone values for each ink color;

a tone value color conversion portion that selects from among said plurality of sets of recording level specifying data, recording level specifying data that matches the printing condition at the time printing is executed, and converts color-converted tone values to recording levels which correspond to a plurality of different ink drop sizes of said N types of ink drops; and a printing execution portion for carrying out printing of the converted recording levels which correspond to a plurality of different ink drop sizes.

3. Printing control program product including a computer-readable medium having a computer program stored thereon, the computer program including program code for controlling a printing device that records ink drops of N types (N is an integer of 2 or greater) of different ink levels onto a printing medium under a plurality of printing conditions, wherein there is recorded onto a predetermined recording medium standard color conversion table data associating tone values of each of the plurality of color components in a predetermined color system with tone values of each of said ink colors, said table data being shared under said plurality of printing conditions; and plurality of sets of recording level specifying data indicating association relationships between tone values of each of said ink colors and recording levels which correspond to a plurality of different ink drop sizes of said N types of ink drops, said data having said recording level determined for each of said plurality of printing conditions in such a way that output color of each tone value is generally common under said plurality of printing conditions;

the program product comprising:

program code for creating recording level specifying data, the program code for creating the recording level specifying data including program code for acquiring standard color value data indicating an association relationship between tone values when representing color of pixels forming an image with tones for each ink color used by the printing device, and color values when printing is carried out with the same tone values under a standard printing condition;

program code for printing a plurality of patches under a predetermined printing condition, by means of a plurality of target recording levels indicating recording levels which correspond to a plurality of different ink drop sizes of said N types of ink drops;

program code for acquiring color value data indicating color values of printed patches; and program code for referring to the acquired color value data and said standard color value data, associating ink drop recording levels and target tone values such that the association relationship of tone values derived by carrying out printing under said predetermined printing condition at recording levels which correspond to a plurality of different ink drop sizes of said N types of ink drops to a plurality of target tone values is substantially equal to the association relationship of color values specified by said standard color value data to tone values;

wherein said standard color value data has been preadjusted so that color values derived when patches are printed, under a standard printing condition, at recording levels derived by conversion of said input tone values by means of said standard color conversion table data and said standard recording level specifying data coincide with color values corresponding to said input tone values;

wherein said recording level specifying data is created individually for each said ink color;

wherein under each of said plurality of printing conditions, printing device resolution may differ; and
wherein under each of said plurality of printing conditions, the type of ink used by the printing device may differ;
program code for acquiring image data in which colors of pixels forming an image are represented by tone values of a plurality of color components in said predetermined color system;
program code that refers to said standard color conversion table to convert tone values of said image data into tone values for each ink color;
program code that selects from among said plurality of sets of recording level specifying data, recording level specifying data that matches the printing condition at the time printing is executed, and converts color-converted tone values to recording levels which correspond to a plurality of different ink drop sizes of said N types of ink drops; and
program code for carrying out printing of the converted recording levels which correspond to a plurality of different ink drop sizes.

* * * * *